(12) United States Patent
Hartig et al.

(10) Patent No.: US 9,382,442 B2
(45) Date of Patent: Jul. 5, 2016

(54) AQUEOUS BINDER COMPOSITIONS

(71) Applicant: BASF SE, Ludwigshafen (DE)

(72) Inventors: Jens Hartig, Basel (CH); Manfred Dargatz, Worms (DE); Karl Haeberle, Speyer (DE); Sebastian Enck, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/400,594

(22) PCT Filed: May 23, 2013

(86) PCT No.: PCT/EP2013/060558
§ 371 (c)(1),
(2) Date: Nov. 12, 2014

(87) PCT Pub. No.: WO2013/174894
PCT Pub. Date: Nov. 28, 2013

(65) Prior Publication Data
US 2015/0099843 A1      Apr. 9, 2015

(30) Foreign Application Priority Data

May 24, 2012   (EP) .................................... 12169244
Nov. 6, 2012    (EP) .................................... 12191424

(51) Int. Cl.
| C09D 133/12 | (2006.01) |
| C08K 5/29 | (2006.01) |
| C08L 33/04 | (2006.01) |
| C09D 133/10 | (2006.01) |
| C08F 265/06 | (2006.01) |
| C09D 151/00 | (2006.01) |

(52) U.S. Cl.
CPC ............ *C09D 133/12* (2013.01); *C08F 265/06* (2013.01); *C08K 5/29* (2013.01); *C08L 33/04* (2013.01); *C09D 133/10* (2013.01); *C08L 2201/54* (2013.01); *C08L 2308/00* (2013.01); *C09D 151/003* (2013.01)

(58) Field of Classification Search
CPC ................................. C09D 133/12; C08K 5/29
See application file for complete search history.

(56) References Cited

U.S. PATENT DOCUMENTS

| 4,820,863 | A |   | 4/1989 | Taylor |
| 4,931,494 | A |   | 6/1990 | Auchter et al. |
| 4,977,219 | A |   | 12/1990 | Watson, Jr. |
| 5,008,363 | A |   | 4/1991 | Mallon et al. |
| 5,047,588 | A |   | 9/1991 | Taylor |
| 5,066,705 | A | * | 11/1991 | Wickert ............... C08G 18/833 428/411.1 |
| 5,104,928 | A | * | 4/1992 | Craun .................. C08F 283/00 524/773 |
| 5,117,059 | A |   | 5/1992 | Taylor |
| 5,258,481 | A |   | 11/1993 | Hesselmans et al. |
| 5,352,400 | A |   | 10/1994 | West |
| 5,714,220 | A |   | 2/1998 | Kage et al. |
| 5,834,542 | A |   | 11/1998 | Kielhorn-Bayer et al. |
| 6,248,819 | B1 |   | 6/2001 | Masuda et al. |
| 2003/0220462 | A1 |   | 11/2003 | Porzio et al. |

(Continued)

FOREIGN PATENT DOCUMENTS

| DE | 44 42 722 A1 | 6/1996 |
| EP | 0 198 343 A2 | 10/1986 |

(Continued)

OTHER PUBLICATIONS

International Search Report issued Jul. 24, 2013 in PCT/EP2013/060558.

(Continued)

*Primary Examiner* — Robert Harlan
(74) *Attorney, Agent, or Firm* — Oblon, McClelland, Maier & Neustadt, L.L.P.

(57) ABSTRACT

The present invention relates to aqueous binder compositions which are based on aqueous multistage polymer dispersions, to the uses of such binder compositions, and to coating compositions comprising them. The aqueous binder composition comprises: a) a polymer P in the form of an aqueous multistage polymer dispersion of dispersed polymer particles, where the polymer particles comprise a first polymer having a glass transition temperature of at least 30° C. and being made of ethylenically unsaturated monomers M-A, and a second polymer having a glass transition temperature of not more than 20° C. and being made of ethylenically unsaturated monomers M-B, where the ethylenically unsaturated monomers M-A and M-B together comprise: i. 85% to 99.45% by weight, preferably 87.5% to 97% by weight and in particular 90% to 95.5% by weight, based in each case on the total amount of monomers M-A+M-B, of at least one neutral, monoethylenically unsaturated monomer M1 having a solubility in water of at most 50 g/l at 25° C. and 1 bar; ii. 0.5% to 10% by weight, preferably 1% to 7.5% by weight and in particular 1.5% to 6.5% by weight, based in each case on the total amount of monomers M-A+M-B, of at least one neutral, monoethylenically unsaturated monomer M2 having a solubility in water of at least 100 g/l at 25° C. and 1 bar; iii. 0.05 to 0.5% by weight, preferably 0.15% to 0.5% by weight and in particular 0.3% to 0.5% by weight, based in each case on the total amount of monomers M-A+M-B, of one or more monoethylenically unsaturated monomers M3 having an acidic group; and iv. optionally from 0 to 5% by weight and in particular from 0 to 4.5% by weight, based in each case on the total amount of monomers M-A+M-B, of one or more monomers M4 having at least two non-conjugated ethylenically unsaturated double bonds; and b) at least one carbodiimide having at least two carbodiimide moieties, which are bound to an aliphatic carbon atom.

31 Claims, No Drawings

(56) References Cited

U.S. PATENT DOCUMENTS

| | | |
|---|---|---|
| 2004/0143058 A1 | 7/2004 | Guo et al. |
| 2006/0247367 A1 | 11/2006 | Guo et al. |
| 2008/0103266 A1 | 5/2008 | Burghardt et al. |
| 2011/0151128 A1 | 6/2011 | Boggs et al. |
| 2011/0217471 A1 | 9/2011 | Schwendeman et al. |

FOREIGN PATENT DOCUMENTS

| | | |
|---|---|---|
| EP | 0 277 361 A1 | 8/1988 |
| EP | 0 507 407 A1 | 10/1992 |
| EP | 0 628 582 A2 | 12/1994 |
| EP | 0 653 461 A2 | 5/1995 |
| EP | 0 686 626 A1 | 12/1995 |
| EP | 0 780 440 A2 | 6/1997 |
| EP | 0 792 908 A1 | 9/1997 |
| EP | 0 878 496 A1 | 11/1998 |
| EP | 0 952 146 A2 | 10/1999 |
| EP | 0 965 582 A2 | 12/1999 |
| EP | 1 227 116 A1 | 7/2002 |
| EP | 2 371 870 A1 | 10/2011 |
| WO | WO 03/025076 A1 | 3/2003 |
| WO | WO 2005/003204 A2 | 1/2005 |
| WO | WO 2007/089142 A1 | 8/2007 |

OTHER PUBLICATIONS

J.W.Taylor, et al., "The Application of Carbodiimide Chemistry to Coatings" Technology for Waterborne Coatings, American Chemical Society, 1997, pp. 137-163.

U.S. Appl. No. 14/767,121, filed Aug. 11, 2015, Adams, et al.

\* cited by examiner

AQUEOUS BINDER COMPOSITIONS

The present invention relates to aqueous binder compositions which are based on aqueous multistage polymer dispersions, to the uses of such binder compositions, and to coating compositions comprising them.

Aqueous polymer dispersions which form polymer films when the aqueous dispersion medium is evaporated have found widespread use. They are used, for example, as aqueous binder systems in paints, in varnishes, in paper coating slips, in leather coating systems, in coating systems for mineral moldings such as fiber cement slabs and concrete roofing shingles, in anticorrosion primers for metals, as binders in nonwovens production, as base materials for adhesives, as additives for hydraulically setting compositions such as plaster or concrete, as additives for clay or loam construction materials, for producing membranes and the like.

It has emerged that polymer dispersions having crosslinked polymer chains possess properties that may be advantageous for many of such applications. The polymer chains may be crosslinked either during or after the emulsion polymerization. The former is referred to as internal, the latter as external crosslinking. Examples of internal crosslinking are free-radical polymerizations of monounsaturated monomers in the presence of polyunsaturated monomers, which function as crosslinking agents. In the case of external crosslinking, polymers which have particular functional or reactive groups are generally crosslinked by irradiation or by addition of a crosslinking agent which reacts with the functional/reactive groups of the polymer to form a coordinative or covalent bond.

It is well known that the addition of crosslinking agents to film forming coating formulations which are based on polymer dispersions may result in coatings having improved properties such as solvent resistance, hardness and mar resistance.

The use of polymers containing carboxyl groups in combination with polycarbodiimides for external crosslinking is known from the documents U.S. Pat. No. 4,977,219, U.S. Pat. No. 5,047,588, U.S. Pat. No. 5,117,059, EP 0 277 361, EP 0 507 407, EP 0 628 582 and U.S. Pat. No. 5,352,400. It is assumed that crosslinking is based on the reaction of the carboxyl groups of the polymers with polycarbodiimides. The reaction typically results in covalent cross-links which are predominately based on N-acyl urea bounds (J. W. Taylor and D. R. Bassett, in E. J. Glass (Ed.), Technology for Waterborne Coatings, ACS Symposium Series 663, Am. Chem. Soc., Washington, D.C., 1997, chapter 8, pages 137 to 163).

The procedures disclosed in the aforementioned documents suffer from several disadvantages, especially when used in coating applications. In particular, in case aromatic polycarbodiimides are used, the obtained coating film tends to undergo undesired discoloration when exposed to UV light. If, on the other hand, aliphatic polycarbodiimides are used the crosslinking process often proceeds so rapidly that it is already quite advanced or even finished before the formation of the coating film is completed. As a consequence the film formation process is impaired leading to generally poor coatings that are frequently porous and/or brittle. In addition, the rapid crosslinking process also causes coating compositions that contain aliphatic polycarbodiimides to usually have undesirably short pot-lives.

These problems are addressed in the document EP 0 780 440 by using crosslinkable compositions that include aliphatic polycarbodiimides and certain polymers. These compositions are reported to slow the crosslinkage process and thus allegedly result in coatings of improved quality. However, the polymers of EP 0 780 440 are severely limited in scope as they are required to include sulfur- or phosphorous-containing acid groups, which are rarely desired in film forming polymer dispersions. Moreover, all compositions disclosed in EP 0 780 440 contain relative high amounts of polycarbodiimide which usually is quite expensive and potentially toxic.

US 2011/0151128 discloses aqueous, curable, one-component coating compositions which contain reaction products of ketocarboxylic acids with polycarbodiimides as crosslinking agents.

US 2011/0217471 describes hydrophilic modified polycarbodiimides based on tetramethylxylylene diisocyante which are useful as crosslinkers for waterborne coating compositions.

EP 1 227 116 describes aqueous two-component coating compositions containing a binder polymer with carboxylic acid and hydroxyl functional groups and a polyfunctional crosslinker having functional groups selected from isocyanate, carbodiimide, aziridinyl and epoxy groups. In the binder polymer, the amount of monomers having acidic groups is at least 5% by weight of the binder polymer.

Aqueous polymer dispersions for use in coating applications are also known in the prior art to be prepared in a multistage polymerization process. Thus, the document EP 2 371 870 describes multistage aqueous emulsion polymers with polymer particles comprising a first polymer shell and a second polymer core. These aqueous emulsion polymers are characterized in EP 2 371 870 as having low levels of volatile organic compounds and providing for coatings with well-balanced properties. However, all emulsion polymers disclosed in EP 2 371 870 do not include means for covalent cross-linking and result in coatings with compromised hardnesses and/or water resistances.

It is an object of the present invention to provide binders based on aqueous polymer dispersions that have improved performance properties and do not suffer the deficiencies of the binders known from the prior art.

Surprisingly it has been found that this and further objects are achieved by binder compositions based on aqueous multistage polymer dispersions with polymer particles comprising a first polymer having a glass transition temperature ($T_g$) of at least 30° C. and a second polymer having a $T_g$ of not more than 20° C., where the binder composition includes at least one carbodiimide having at least two carbodiimide moieties, which are bound to an aliphatic carbon atom.

The invention accordingly first provides an aqueous binder composition comprising a) a polymer P in the form of an aqueous multistage polymer dispersion of dispersed polymer particles, where the polymer particles comprise a first polymer having a glass transition temperature of at least 30° C. and being made of ethylenically unsaturated monomers M-A, and a second polymer having a glass transition temperature of not more than 20° C. and being made of ethylenically unsaturated monomers M-B, where the ethylenically unsaturated monomers M-A and M-B together comprise:
i. 85% to 99.45% by weight, preferably 87.5% to 97% by weight and in particular 90% to 95.5% by weight, based in each case on the total amount of monomers M-A+M-B, of at least one neutral, monoethylenically unsaturated monomer M1 having a solubility in water of at most 50 g/l at 25° C. and 1 bar;
ii. 0.5% to 10% by weight, preferably 1% to 7.5% by weight and in particular 1.5% to 6.5% by weight, based in each case on the total amount of monomers M-A+M-

B, of at least one neutral, monoethylenically unsaturated monomer M2 having a solubility in water of at least 100 g/l at 25° C. and 1 bar;

iii. 0.05 to 0.5% by weight, preferably 0.15% to 0.5% by weight and in particular 0.3% to 0.5% by weight, based in each case on the total amount of monomers M-A+M-B, of one or more monoethylenically unsaturated monomers M3 having an acidic group; and iv. optionally from 0 to 5% by weight and in particular from 0 to 4.5% by weight, based in each case on the total amount of monomers M-A+M-B, of one or more monomers M4 having at least two non-conjugated ethylenically unsaturated double bonds;

and b) at least one carbodiimide having at least two carbodiimide moieties, which are bound to an aliphatic carbon atom.

In this context "neutral" means that the monomers M1 and M2 are neither protonated nor act as an acid in an aqueous environment.

The aqueous binder composition of the invention preferably comprises a polymer P in the form of an aqueous multistage polymer dispersion of dispersed polymer particles, herein also referred to as dispersion D, where the polymer particles comprise a first polymer having a glass transition temperature of at least 30° C. and being made of ethylenically unsaturated monomers M-A, and a second polymer having a glass transition temperature of not more than 20° C. and being made of ethylenically unsaturated monomers M-B, where the polymer particles comprise:

a) 5 to 50% by weight, more preferably from 15 to 50% by weight and in particular from 20 to 45% by weight, in each case on the total weight of the first polymer and the second polymer, of said first polymer, where the monomers M-A forming the first polymer consist of:

i. 80 to 99.4% by weight, preferably 81 to 95% by weight and in particular 82.5 to 93% by weight, based in each case on the total amount of monomers M-A of at least one neutral, monoethylenically unsaturated monomer M1 having a solubility in water of at most 50 g/l at 25° C. and 1 bar;

ii. 0.5% to 20% by weight, preferably 2.5 to 18% by weight and in particular 5 to 16% by weight, based in each case on the total amount of monomers M-A, of at least one neutral, monoethylenically unsaturated monomer M2 having a solubility in water of at least 100 g/l at 25° C. and 1 bar.

iii. 0.1 to 2% by weight, preferably 0.5 to 1.75% by weight and in particular 1 to 1.6% by weight, based in each case on the total amount of monomers M-A, of one or more monoethylenically unsaturated monomers M3 having an acidic group;

b) 50 to 95% by weight, more preferably from 52 to 85% by weight and in particular from 55 to 80% by weight, in each case on the total weight of the first polymer and the second polymer, of said second polymer, where the monomers M-B forming the second polymer comprise iv. 90 to 100% by weight, preferably 91.5 to 100% by weight and in particular 92.5 to 98% by weight, based in each case on the total amount of monomers M-B, of at least one neutral, monoethylenically unsaturated monomer M1 having a solubility in water of at most 50 g/l at 25° C. and 1 bar and v. optionally from 0 to 10% by weight, preferably 0 to 8% by weight and in particular 0 to 6.5% by weight, based in each case on the total amount of monomers M-B, of one or more monomers M4 having at least two non-conjugated ethylenically unsaturated double bonds;

where the polymer P is as defined above and in particular has the same overall composition of monomers M-A and M-B detailed above.

The above defined dispersion D represents an embodiment per se of the present invention.

By the glass transition temperature ($T_g$) is meant herein the midpoint temperature according to ASTM 3418/82, as may be determined by means of dynamic-mechanical thermal analysis (DMTA). The glass transition temperature of a polymer can also be determined by differential scanning calorimetry (DSC) in accordance with the method indicated in connection with the examples. The glass transition temperatures of said first and second polymers may be set through appropriate selection of the monomers M-A and M-B, respectively. The glass transition temperature ($T_g$) of said first polymer included in the polymer P is generally at least 40° C., preferably at least 60° C. and in particular at least 70° C. For example, $T_g$ of the first polymer may be in the range of 40 to 200° C., preferably in the range of 60 to 150° C. and specifically in the range of 70 to 120° C. The $T_g$ of the second polymer included in the polymer P, in turn, is generally not more than 35° C., preferably not more than 30° C. and in particular not more than 25° C. For example, the $T_g$ of the second polymer may be in the range of −25 to 35° C., preferably in the range of −20 to 30° C. and specifically in the range of −15 to 25° C.

The invention further provides an aqueous multistage polymer dispersion of dispersed polymer particles, as defined above, which is obtained by sequential aqueous radical emulsion polymerization, which comprises (1) aqueous emulsion polymerization of the monomers M-A to obtain an aqueous dispersion of the first polymer and (2) aqueous emulsion polymerization of the monomers M-B in the aqueous dispersion of the first polymer.

The binder compositions of the invention are suitable for a multiplicity of applications in which binder compositions based on aqueous polymer dispersions are used. When used as binders in coating compositions, they result in coatings that, compared to coatings obtained from prior art binders based on a combination of a carboxyl-modified polymer and a polycarbodiimide, exhibit similarly favorable resistances to water, water steam and chemicals, but substantially improved flexibility. In addition, the inventive binder compositions have lower viscosities at basic pH values and also longer pot-lives than said prior art binders that comprise polymers with a higher proportions of carboxyl groups. Furthermore, through the use of the binders of the invention in paints and varnishes it is possible to obtain high-quality coatings that generally have good adhesion to a multitude of surfaces. Thus, the inventive compositions are particularly useful as binders in primers for metallic substrates, in topcoat paint systems for multilayer coatings on metal and plastic surfaces, in wood varnishes and in flooring applications. Moreover, in comparison to commonly used binders based on epoxide or polyurethane resins, the binder compositions of the invention feature low levels of both, solvents and reactive components, which are undesirable as they may present health and/or environmental hazards.

The present invention accordingly further provides for the use of binder compositions as defined above in coating compositions for coating metal surfaces.

The present invention further provides for the use of binder compositions as defined above in coating compositions for coating wooden surfaces.

The present invention further provides for the use of binder compositions as defined above in coating compositions for coating surfaces of plastic or composites.

The present invention further provides for the use of binder compositions as defined above in coating compositions for coating surfaces of concrete or surfaces of fibrous cement sheets.

The polymers P of the aqueous multistage polymer dispersions used to produce the coatings of the invention are present in the form of dispersed polymer particles. The polymers P are typically obtainable by free-radical aqueous emulsion polymerization of ethylenically unsaturated monomers M-A and M-B, which comprise the monomers specified above and below in the quantities indicated there.

Additionally provided by the invention are the coating compositions, especially paints, varnishes, lacquers, sealants, and coating materials for concrete surfaces or surfaces of fibrous cement sheets, which comprise a binder composition of the invention.

In the context of the present invention the expression "alkyl" comprises straight-chain and branched alkyl groups, especially having 1 to 30 carbon atoms, i.e., for "$C_1$-$C_{30}$ alkyl".

Suitable short-chain alkyl groups are, for example, straight-chain or branched $C_1$-$C_7$ alkyl, preferably $C_1$-$C_6$ alkyl, and more preferably $C_1$-$C_4$ alkyl groups. These include, in particular, methyl, ethyl, propyl, isopropyl, n-butyl, 2-butyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, etc.

Suitable longer-chain alkyl groups are, for example, straight-chain and branched $C_8$-$C_{30}$ alkyl groups, preferably $C_8$-$C_{20}$ alkyl groups. Preferably these are predominantly linear alkyl radicals, such as also occur in natural or synthetic fatty acids and fatty alcohols and also in oxo-process alcohols. They include, for example, n-octyl, n-nonyl, n-decyl, n-undecyl, n-dodecyl, n-tridecyl, n-tetradecyl, n-pentadecyl, n-hexadecyl, n-heptadecyl, n-octadecyl, and n-nonadecyl. The expression "alkyl" comprises unsubstituted and substituted alkyl radicals.

The above observations concerning alkyl also apply analogously to the alkyl groups in alkanol, alkylamine, alkylketone, and alkanecarboxylic acids.

The expression "alkylene" in the context of the present invention stands for straight-chain or branched alkanediyl groups having 1 to 7 carbon atoms, such as, for example, methylene, 1,2-ethylene, 1,2-propylene, 1,3-propylene, 1,2-butylene, 1,3-butylene, 1,4-butylene, 2-methyl-1,2-propylene, etc.

As described in detail before, the polymer particles of the polymer P that is included in the aqueous binder composition according to the present invention comprise a first polymer made up of ethylenically unsaturated monomers M-A, and a second polymer made up of ethylenically unsaturated monomers M-B.

According to a preferred embodiment of the invention the aqueous binder composition comprises polymer particles of polymer P that consist of said first polymer and said second polymer.

The amount of the first polymer typically is in the range from 2 to 60% by weight, preferably from 5 to 50% by weight, more preferably from 15 to 50% by weight and in particularly from 20 to 45% by weight, in each case based on the total weight of the first polymer and the second polymer.

The first polymer of the polymer P according to the invention is preferably formed of monomers M-A which comprise:

i. 80 to 99.4% by weight, more preferably 81 to 95% by weight and in particular 82.5 to 93% by weight, based in each case on the total amount of monomers M-A of at least one neutral, monoethylenically unsaturated monomer M1 having a solubility in water of at most 50 g/l at 25° C. and 1 bar;

ii. 0.5% to 20% by weight, more preferably 2.5 to 18% by weight and in particular 5 to 16% by weight, based in each case on the total amount of monomers M-A, of at least one neutral, monoethylenically unsaturated monomer M2 having a solubility in water of at least 100 g/l at 25° C. and 1 bar.

iii. 0.1 to 2% by weight, more preferably 0.5 to 1.75% by weight and in particular 1 to 1.6% by weight, based in each case on the total amount of monomers M-A, of one or more monoethylenically unsaturated monomers M3 having an acidic group;

The second polymer of the polymer P according to the invention is preferably formed of monomers M-A which comprise 90 to 100% by weight, more preferably 91 to 100% by weight and in particular 92.5 to 100% by weight, based in each case on the total amount of monomers M-B; of at least one neutral, monoethylenically unsaturated monomer M1 having a solubility in water of at most 50 g/l at 25° C. and 1 bar.

According to an embodiment of the invention the monomers M-B forming the second polymer of the polymer P, as included in the inventive binder composition or in the inventive dispersion D, comprise 0.1 to 10% by weight, preferably 2 to 8% by weight and in particular 3 to 6.5% by weight, based in each case on the total amount of monomers M-B, of one or more monomers M4 having at least two non-conjugated ethylenically unsaturated double bonds.

According to a preferred embodiment of the invention the monomers M-B forming the second polymer of the polymer P, as included in the inventive binder composition or in the inventive dispersion D, do not comprise a monomer M4 or comprise less than 0.01% by weight, based on the weight of monomers M-B, of monomers M4 having at least two non-conjugated ethylenically unsaturated double bonds.

The first polymer of the polymer P, as included in the inventive binder composition or in the inventive dispersion D, preferably has a number average molecular weight $M_n$ in the range from 1,000 to 500,000 g/mol, more preferably from 2,000 to 100,000 g/mol, and in particular from 5,000 to 50,000 g/mol. The molar mass may be determined by gel permeation chromatography with a standard, such as polymethyl methacrylate.

The second polymer of the polymer P, as included in the inventive binder composition or in the inventive dispersion D, preferably has a number average molecular weight $M_n$ of at least 500,000 g/mol, preferably of at least 1,000,000 g/mol, and in particular of at least 1,500,000 g/mol, for example in the range from 500,000 to 10,000,000 g/mol, more preferably from 1,000,000 g/mol to 5,000,000 g/mol, and in particular from 1,500,000 to 2,500,000 g/mol. The molar mass may be determined by gel permeation chromatography with a standard, such as polymethyl methacrylate.

Furthermore, the polymer P, as included in the inventive binder composition or in the inventive dispersion D, has an acid number of not more than 10 mg KOH, more preferably not more than 7.5 mg KOH in particular not more than 5 mg KOH. "Acid number" herein means the milligrams (mg) of potassium hydroxide (KOH) required for neutralizing 1 gram of polymer P.

The polymer particles that are present in the inventive binder composition or in the inventive dispersion D generally have an average particle diameter in the range form 5 to 1000 nm, frequently in the range form 10 to 500 nm, preferably in the range form 15 to 250 nm, more preferably in the range of 20 to 150 nm, and particularly in the range form 25 to 100 nm. The polymer particles may have either a monomodal particle size distribution, in other words a Gaussian distribution with only one maximum, or may have a polymodal distribution with at least two pronounced maxima, which differ generally by at least 50 nm. The average particle diameter is understood to be the average value of the cumulant analysis (mean of fits) as determined by quasielastic light scattering (QELS) on diluted polymer dispersions (0.001% to 1% by weight, 22° C.).

The polymer P, as included in the inventive binder composition or in the inventive dispersion D, contains in copolymerized form at least one neutral, monoethylenically unsaturated monomer M1 having a solubility in deionized water of at most 50 g/l at 25° C. and 1 bar. Preferably, the water-solubility of monomers M1 does not exceed 40 g/l, in particular not exceed 30 g/l and is typically situated in the range from 0.1 to 50 g/l, preferably in the range from 0.1 to 40 g/l and in particular in the range form 0.1 to 50 g/l (25° C., 1 bar).

The monomers M1 are monoethylenically unsaturated, i.e. have precisely one ethylenically unsaturated C=C double bond. The monomers M1 are preferably selected from esters and diesters of monoethylenically unsaturated $C_3$-$C_8$-monocarboxylic and $C_4$-$C_8$-dicarboxylic acids with $C_1$-$C_{30}$-alkanols, particularly with $C_1$-$C_{10}$-alkanols, esters of vinyl alcohols or allyl alcohols with $C_1$-$C_{30}$-monocarboxylic acids, vinylaromatic hydrocarbons, amides and diamides of monoethylenically unsaturated $C_3$-$C_8$-monocarboxylic and $C_4$-$C_8$-dicarboxylic acids with $C_1$-$C_{30}$-alkylamines or di-$C_1$-$C_{30}$-alkylamines, especially with $C_1$-$C_{10}$-alkylamines or di-$C_1$-$C_{10}$-alkylamines, and mixtures thereof.

The term "monoethylenically unsaturated $C_3$-$C_8$-monocarboxylic acid" stands for a monovalent carboxylic acid having 3 to 8 C atoms that has an ethylenically unsaturated C=C double bond, such as acrylic acid, methacrylic acid, vinylacetic acid or crotonic acid, for example.

The term "monoethylenically unsaturated $C_4$-$C_8$ dicarboxylic acid" stands for a divalent carboxylic acid having 4 to 8 C atoms that has an ethylenically unsaturated C=C double bond, such as maleic acid, fumaric acid, itaconic acid or citraconic acid, for example.

Further suitable monomers M1 are, for example, vinyl halides, vinylidene halides, and mixtures thereof.

Suitable esters and diesters of monoethylenically unsaturated $C_3$-$C_8$-monocarboxylic and $C_4$-$C_8$-dicarboxylic acids with $C_1$-$C_{30}$-alkanols, especially with $C_1$-$C_{10}$-alkanols, are, in particular, the esters of monoethylenically unsaturated $C_3$-$C_8$ monocarboxylic acids, especially the esters of acrylic acid and the esters of methacrylic acid, with $C_1$-$C_{30}$-alkanols, in particular with $C_1$-$C_{10}$-alkanols, such as methyl (meth) acrylate, methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth) acrylate, n-heptyl (meth)acrylate, n-octyl (meth)acrylate, 1,1,3,3-tetramethylbutyl (meth)acrylate, ethylhexyl (meth) acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth) acrylate, heptadecyl (meth)acrylate, nonadecyl (meth)acrylate, arachidyl (meth)acrylate, behenyl (meth)acrylate, lignoceryl (meth)acrylate, cerotyl (meth)acrylate, melissyl (meth) acrylate, palmitoleyl (meth)acrylate, oleyl (meth)acrylate, linolyl (meth)acrylate, linolenyl (meth)acrylate, stearyl (meth)acrylate and lauryl (meth)acrylate, but also the diesters of monoethylenically unsaturated $C_4$-$C_8$ dicarboxylic acids, in particular the diesters of maleic acid with $C_1$-$C_{30}$ alkanols, such as dimethyl maleate, diethyl maleate, di(n-propyl) maleate, diisopropyl maleate, di(n-butyl) maleate, di(n-hexyl) maleate, di(1,1,3,3-tetramethylbutyl) maleate, di(n-nonyl) maleate, ditridecyl maleate, dimyristyl maleate, dipentadecyl maleate, dipalmityl maleate, diarachidyl maleate and mixtures thereof. The term "(meth)acrylate" here comprises both, the corresponding ester of acrylic acid and also the corresponding ester of methacrylic acid.

Suitable esters of vinyl alcohol and allyl alcohol with $C_1$-$C_{30}$-monocarboxylic acids are, for example, vinyl formate, vinyl acetate, vinyl propionate, vinyl butyrate, vinyl laurate, vinyl stearate, vinyl esters of Versatic acid, allyl formate, allyl acetate, allyl propionate, allyl butyrate, allyl laurate, and mixtures thereof.

Suitable vinylaromatic hydrocarbons are styrene, 2-methylstyrene, 4-methylstyrene, 2-n-butylstyrene, 4-n-butylstyrene, 4-n-decylstyrene, especially styrene.

Suitable amides and diamides of monoethylenically unsaturated $C_3$-$C_8$ monocarboxylic and $C_4$-$C_8$ dicarboxylic acids with $C_1$-$C_{30}$ alkylamines or di-$C_1$-$C_{30}$ alkylamines, in particular with $C_1$-$C_{10}$ alkylamines or di-$C_1$-$C_{10}$ alkylamines, are, in particular, the amides of acrylic acid and of methacrylic acid with $C_1$-$C_{30}$ alkylamines or di-$C_1$-$C_{30}$ alkylamines, in particular with $C_1$-$C_{10}$ alkylamines or di-$C_1$-$C_{10}$ alkylamines, such as, for example, N-methyl(meth)acrylamide, N-ethyl(meth)acrylamide, N-propyl(meth)acrylamide, N-(n-butyl)(meth)acrylamide, N-(tert-butyl)(meth)acrylamide, N-(n-octyl)(meth)-acrylamide, N-(1,1,3,3-tetramethylbutyl)(meth)acrylamide, N-ethylhexyl(meth)-acrylamide, N-(n-nonyl)(meth)acrylamide, N-(n-decyl)(meth)acrylamide, N-(n-undecyl)(meth)acrylamide, N-tridecyl(meth) acrylamide, N-myristyl(meth)-acrylamide, N-pentadecyl (meth)acrylamide, N-palmityl(meth)acrylamide, N-heptadecyl(meth)acrylamide, N-nonadecyl(meth)acrylamide, N-arachidyl(meth)-acrylamide, N-behenyl(meth)acrylamide, N-lignoceryl(meth)acrylamide, N-cerotyl-(meth) acrylamide, N-melissyl(meth)acrylamide, N-palmitoleyl (meth)acrylamide, N-oleyl(meth)acrylamide, N-linolyl (meth)acrylamide, N-linolenyl(meth)acrylamide, N-stearyl (meth)acrylamide, N-lauryl(meth)acrylamide, N,N-dimethyl (meth)acrylamide, N,N-diethyl(meth)acrylamide, but also the diamides and imides of maleic acid with $C_1$-$C_{30}$ alkylamines or di-$C_1$-$C_{30}$ alkylamines, in particular with $C_1$-$C_{10}$ alkylamines or di-$C_1$-$C_{10}$ alkylamines, such as, for example, N,N'-dimethylmaleamide, N,N'-diethyl-maleamide, N,N'-dipropylmaleamide, N,N'-di-(tert-butyl)maleamide, N,N'-di-(n-octyl)-maleamide, N,N'-di-(n-nonyl)maleamide, N,N'-ditridecylmaleamide, N,N'-dimyristyl-maleamide, N,N,N',N'-tetramethylmaleamide, N,N,N',N'-tetraethylmaleamide, and mixtures thereof. The term "(meth)acrylamide" here comprises both, the corresponding amide of acrylic acid and the corresponding amide of methacrylic acid.

Suitable vinyl halides and vinylidene halides are vinyl chloride, vinylidene chloride, vinyl fluoride, vinylidene fluoride, and mixtures thereof.

The at least one monomer M1 is preferably selected from esters of monoethylenically unsaturated $C_3$-$C_8$-monocarboxylic acids, in particular the esters of acrylic acid (acrylates) and the esters of methacrylic acid (methacrylates), with $C_1$-$C_{10}$-alkanols, and vinylaromatic hydrocarbons, more particularly from $C_1$-$C_{10}$-alkylacrylates and $C_1$-$C_{10}$-alkylmethacrylates and vinylaromatic hydrocarbons, and especially from methyl acrylate, ethyl acrylate, n-propyl acrylate, iso-propyl acrylate, n-butyl acrylate, n-propyl acrylate, isopropyl acrylate, tert-butyl acrylate, 2-ethylhexyl acrylate, methyl methacrylate, n-butyl methacrylate, tert-butyl methacrylate and styrene.

According to one preferred embodiment of the invention, the polymers P comprise in copolymerized form at least two monomers M1 which are selected from esters of monoethylenically unsaturated $C_3$-$C_8$-monocarboxylic acids, more particularly the esters of acrylic acid and methacrylic acid, with $C_1$-$C_{30}$-alkanols, in particular with $C_1$-$C_{10}$-alkanols, and vinylaromatic hydrocarbons. According to one particularly preferred embodiment, the polymers P comprise in copolymerized form at least one monomer M1.1 and at least one monomer M1.2, the at least one monomer M1.1 being selected from $C_1$-$C_{10}$ alkylacrylates and preferably from methyl acrylate, ethyl acrylate, n-propyl acrylate, iso-propyl acrylate, n-butyl acrylate, n-propyl acrylate, iso-propyl acrylate, tert-butyl acrylate and 2-ethylhexyl acrylate, and the at least one monomer M1.2 being selected from $C_1$-$C_{10}$ alkyl methacrylates and vinylaromatics, and preferably from methyl methacrylate, n-butyl methacrylate, tert-butyl methacrylate and styrene.

According to the invention the fraction of the monomers M1, based on the total amount of the monomers M-A+M-B, is in the range from 85% to 99.45% by weight, preferably in the range from 87.5% to 97% by weight, and in particular in the range from 90% to 95.5% by weight. In addition, the fraction of the monomers M1, based on the total amount of the monomers M-A, is from 80 to 99.4% by weight, preferably from 81 to 95% by weight, and in particular from 82.5 to 93% by weight, whereas the fraction of the monomers M1, based on the total amount of the monomers M-B, is from 90 to 100% by weight, preferably from 91.5 to 100% by weight, and in particular from 92.5 to 98% by weight.

Furthermore, for a number of applications those polymers P are preferred which comprise in a copolymerized form the monomers M1.1 and M1.2 in a weight ratio of monomers M1.1 to monomers M1.2 in the range from 7.5:1 to 1:15, preferably in the range from 3:1 to 1:10, and especially in the range from 2:1 to 1:5.5. In this context particularly preferred polymers P are those that comprise 5% to 80% by weight and preferably 10% to 60% by weight of copolymerized monomers M1.1 and also 20% to 95% by weight and preferably 40% to 90% by weight of copolymerized monomers M1.2.

The polymer P, as included in the inventive binder composition or in the inventive dispersion D, contains in copolymerized form at least one neutral, monoethylenically unsaturated monomer M2 having a solubility in deionized water of at least 100 g/l at 25° C. and 1 bar. Preferably, the water-solubility of monomers M2 is at least 150 g/l, more preferably at least 250 g/l and in particular at least 500 g/l (25° C., 1 bar).

According to a preferred embodiment of the invention the at least one monomer M2 is miscible with water in any ratio at 25° C. and 1 bar.

The monomers M2 are preferably selected from hydroxy-$C_2$-$C_4$ alkyl esters of monoethylenically unsaturated $C_3$-$C_8$ monocarboxylic acids, primary amides of monoethylenically unsaturated $C_3$-$C_8$ monocarboxylic acids, esters of hydroxy-$C_3$-$C_{10}$-alkylketones with monoethylenically unsaturated $C_3$-$C_8$ monocarboxylic acids, amides of amino-$C_3$-$C_{10}$-alkylketones with monoethylenically unsaturated $C_3$-$C_8$-monocarboxylic acids, monoesters of monoethylenically unsaturated $C_3$-$C_8$-carboxylic acids with polyoxy-$C_2$-$C_4$ alkylene ethers, and monoethylenically unsaturated monomers having at least one urea group, and mixtures thereof.

Hydroxy-$C_2$-$C_4$-alkyl esters of monoethylenically unsaturated $C_3$-$C_8$-monocarboxylic acids that are suitable as M2 are, for example, the hydroxy-$C_2$-$C_4$-alkyl esters of acrylic acid and of methacrylic acid, such as 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, and mixtures thereof.

Primary amides of monoethylenically unsaturated $C_3$-$C_8$-monocarboxylic acids that are suitable as M2 are, for example, acrylamide, metharylamide, and mixtures thereof.

Esters of hydroxy-$C_3$-$C_{10}$-alkylketones with monoethylenically unsaturated $C_3$-$C_8$-monocarboxylic acids that are suitable as M2 are, for example, N-(2-oxopropyl)acrylester, N-(2-oxopropyl)methacrylester, N-(1-methyl-2-oxopropyl)acrylester, N-(3-oxobutyl)acrylester, N-(3-oxobutyl)methacrylester, N-(1,1-dimethyl-3-oxobutyl)acrylaester, N-(1,1-dimethyl-3-oxobutyl)methacrylester, N-(4-oxohexyl)acrylester, and mixtures thereof.

Amides of amino-$C_3$-$C_{10}$-alkylketones with monoethylenically unsaturated $C_3$-$C_8$-monocarboxylic acids that are suitable as M2 are, for example, N-(2-oxopropyl)acrylamide, N-(2-oxopropyl)methacrylamide, N-(1-methyl-2-oxopropyl)acrylamide, N-(3-oxobutyl)acrylamide, N-(3-oxobutyl)methacrylamide, N-(1,1-dimethyl-3-oxobutyl)acrylamide (also named diacetone acrylamide), N-(1,1-dimethyl-3-oxobutyl)methacrylamide, N-(4-oxohexyl)acrylamide, and mixtures thereof.

Suitable monomers M2 from the group of the monoesters of monoethylenically unsaturated $C_3$-$C_8$-carboxylic acids with polyoxy-$C_2$-$C_4$ alkylene ethers are, for example, the monoesters of monoethylenically unsaturated $C_3$-$C_8$-carboxylic acids, more particularly of acrylic acid and of methacrylic acid, with poly-$C_2$-$C_4$ alkylene ethers of the general formula (A)

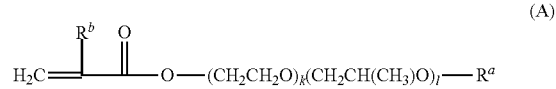

(A)

in which
the sequence of the alkylene oxide units is arbitrary,
k and l independently of one another are each an integer in the range from 0 to 100, in particular in the range from 0 to 50, the sum of k and l being at least 3, more particularly 4, e.g., 3 to 200, and more particularly 4 to 100,
$R^a$ is hydrogen, $C_1$-$C_{30}$-alkyl, $C_5$-$C_8$-cycloalkyl or $C_6$-$C_{14}$-aryl, and
$R^b$ is hydrogen or $C_1$-$C_8$ alkyl, more particularly hydrogen or methyl.

Preferably k is an integer from 3 to 50, more particularly 4 to 30. Preferably l is an integer from 0 to 30, more particularly 0 to 20. More preferably l is 0. Preferably the sum of k and l is situated in the range from 3 to 50 and more particularly in the range from 4 to 40.

$R^a$ in the formula (A) is preferably hydrogen, $C_1$-$C_{20}$ alkyl, e.g., methyl, ethyl, n-propyl, isopropyl, n-butyl or sec-butyl, n-pentyl, n-hexyl, octyl, 2-ethylhexyl, decyl, lauryl, palmityl or stearyl. $R^a$ is more preferably hydrogen or $C_1$-$C_4$ alkyl.

$R^b$ is preferably hydrogen or methyl.

Suitable monomers M2 having at least one urea group are, for example, N-vinylurea, N-(2-acryloyloxyethyl)imidazolidin-2-one and N-(2-methacryloyloxyethyl)imidazolidin-2-one (2-ureidomethacrylate, UMA).

The at least one monomer M2 is preferably selected from hydroxy-$C_2$-$C_4$-alkyl esters of acrylic acid or methacrylic acid, esters of hydroxy-$C_3$-$C_{10}$-alkylketones with acrylic acid or methacrylic acid, amides of hydroxy-$C_3$-$C_{10}$-alkylketones with acrylic acid or methacrylic acid, 2-ureidomethacrylate, and poly-$C_2$-$C_4$-alkylene ethers of the general formula (A')

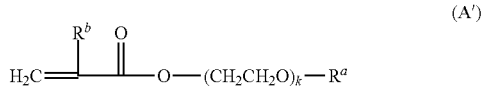

in which k is an integer from 4 to 40, $R^a$ is hydrogen or $C_1$-$C_4$ alkyl, and $R^b$ is hydrogen or methyl. More preferably the at least one monomer M2 is selected from hydroxy-$C_2$-$C_4$-alkyl esters of acrylic acid or methacrylic acid and amides of hydroxy-$C_3$-$C_{10}$-alkylketones with acrylic acid or methacrylic acid, and in particular from N-(1,1-dimethyl-3-oxobutyl)acrylamide, N-(1,1-dimethyl-3-oxobutyl)methacrylamide, 2-hydroxyethyl acrylate and 2-hydroxyethyl methacrylate.

According to an embodiment of the present invention, the polymers P comprise in copolymerized form only one monomer M2 which is selected from the monomers M2 mentioned herein, in particular those mentioned as preferred.

According to a preferred embodiment of the present invention, the polymers P comprise in copolymerized form at least two monomers M2, and especially comprise only two monomers M2, which are selected from the monomers M2 mentioned herein, in particular those mentioned as preferred.

According to the invention the fraction of the monomers M2, based on the total amount of the monomers M-A+M-B, is in the range from 5% to 10% by weight, preferably in the range from 1% to 7.5% by weight, and in particular in the range from 1.5% to 6.5% by weight. In addition, the fraction of the monomers M2, based on the total amount of the monomers M-A, is from 0.5% to 20% by weight, preferably from 2.5 to 18% by weight, and in particular from 5 to 16% by weight.

According to another preferred embodiment of the invention typically at least 95% by weight, preferably at least 98% by weight and in particular at least 99% by weight of the total amount of monomers M2 included in a polymer P in copolymerized form, are part of the monomers M-A forming the first polymer of the polymer P.

The polymer P, as included in the inventive binder composition or in the inventive dispersion D, contains in copolymerized form one or more monoethylenically unsaturated monomers M3 having an acidic group. The acidic groups of the monomers M3 are typically selected from the group consisting of a carboxylic acid group (—COOH), a sulfonic acid group (—$SO_3H$), a phosphonic acid group (—$PO_3H_2$), the corresponding monoester group, a phosphoric monoester group (—OP(=O)(OH)$_2$) and a phosphoric diester group ((—O)$_2$P(=O)(OH)).

Suitable monomers M3 having a carboxylic acid group are, for example, monoethylenically unsaturated $C_3$-$C_8$-monocarboxylic acids, such as in particular acrylic acid and methacrylic acid, and monoethylenically unsaturated $C_4$-$C_8$ dicarboxylic acids, such as in particular maleic acid, fumaric acid and itaconic acid, and mixtures thereof.

Suitable monomers M3 having a sulfonic acid group are, for example, unsaturated sulfonic acids, such as vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids and their derivatives, e.g. styrene-4-sulfonic acid and styrene-3-sulfonic acid, 2-acrylamido-2-methylpropanesulfonic acid, and mixtures thereof.

Suitable monomers M3 having a phosphonic acid group are, for example unsaturated phosphonic acids, such as vinylphosphonic acid, allylphosphonic acid, and mixtures thereof.

Suitable monomers M3 having a phosphoric acid mono- or diester group are, for example, the monoesters and diesters of phosphoric acid with hydroxy-$C_2$-$C_4$ alkyl acrylates or methacrylates, such as hydroxyethyl acrylate, hydroxypropyl acrylate, hydroxybutyl acrylate, hydroxyethyl methacrylate, hydroxypropyl methacrylate or hydroxybutyl methacrylate, and mixtures of these mono- and/or diesters.

The monomers M3 are preferably selected from monoethylenically unsaturated $C_3$-$C_8$-monocarboxylic acids, such as in particular acrylic acid and methacrylic acid, and monoethylenically unsaturated $C_4$-$C_8$ dicarboxylic acids, such as in particular maleic acid, fumaric acid and itaconic acid, and mixtures thereof. More preferably the monomers M3 are selected from acrylic acid and methacrylic acid and in particular are acrylic acid.

According to a preferred embodiment of the present invention, the polymers P comprise in copolymerized form only one monomer M3 which is selected from the monomers M3 mentioned herein, in particular those mentioned as preferred, and which according to a particularly preferred embodiment is acrylic acid.

According to the invention the fraction of the monomers M3, based on the total amount of the monomers M-A+M-B, is in the range from 0.05 to 0.5% by weight, preferably in the range from 0.15% to 0.5% by weight, and in particular in the range from 0.3% to 0.5% by weight. In addition, the fraction of the monomers M3, based on the total amount of the monomers M-A, is from 0.1 to 2% by weight, preferably from 0.5 to 1.75% by weight, and in particular from 1 to 1.6% by weight.

According to a preferred embodiment of the invention typically at least 95% by weight, preferably at least 98% by weight and in particular at least 99% by weight of the total amount of monomers M3 included in a polymer P in copolymerized form, are part of the monomers M-A forming the first polymer of the polymer P.

The polymer P, as included in the inventive binder composition or in the inventive dispersion D, contains in copolymerized form one or more monomers M4 that have at least two non-conjugated ethylenically unsaturated double bonds.

According to another preferred embodiment of the invention the monomers M4 have only two non-conjugated ethylenically unsaturated double bonds.

The monomers M4 are preferably selected from hydroxydiesters of monoethylenically unsaturated $C_3$-$C_8$ monocarboxylic acids with saturated aliphatic or cycloaliphatic diols, monoesters of monoethylenically unsaturated $C_3$-$C_8$ monocarboxylic acids with monoethylenically unsaturated aliphatic or cycloaliphatic monohydroxy compounds and divinyl aromatic compounds, and mixtures thereof.

Hydroxydiesters of monoethylenically unsaturated $C_3$-$C_8$ monocarboxylic acids with saturated aliphatic or cycloaliphatic diols that are suitable as M4 are, for example, diacrylates and the dimethacrylates of saturated aliphatic or cycloaliphatic diols, such as the diacrylates and the dimethacrylates of ethylene glycol (1,2-ethanediol), propylene glycol (1,2-propanediol), 1,2-butanediol, 1,3-butanediol, 1,4-butanediol, neopentyl glycol (2,2-dimethyl-1,3-propanediol) or 1,2-cyclohexanediol, and mixtures thereof.

Monoesters of monoethylenically unsaturated $C_3$-$C_8$ monocarboxylic acids with monoethylenically unsaturated aliphatic or cycloaliphatic monohydroxy compounds that are suitable as M4 are, for example, acrylates and the methacrylates of monoethylenically unsaturated aliphatic or cycloaliphatic monohydroxy compounds, such as acrylates and the methacrylates of vinyl alcohol (ethenol), allyl alcohol (2-propen-1-ol) or 2-cyclohexen-1-ol, and mixtures thereof.

Suitable monomers M4 from the group of divinyl aromatic compounds are, for example, 1,3-divinyl benzene, 1,4-divinyl benzene, and mixtures thereof.

The monomers M4 are preferably selected from the diacrylates and dimethacrylates of saturated aliphatic or cycloaliphatic diols, more preferably form the diacrylates and dimethacrylates of saturated aliphatic diols and in particular from the diacrylates of saturated aliphatic diols, such as the diacrylates of ethylene glycol, propylene glycol, 1,2-butanediol, 1,3-butanediol and 1,4-butanediol.

According to a preferred embodiment of the present invention, the polymers P comprise in copolymerized form only one monomer M4 which is selected from the monomers M4 mentioned herein, in particular those mentioned as preferred, and which according to a particularly preferred embodiment is diacrylate of 1,4-butanediol.

According to the invention the fraction of the monomers M4, based on the total amount of the monomers M-A+M-B, is in the range from 0 to 5% by weight and in particular in the range from 0% to 4.5% by weight. In addition, the fraction of the monomers M4, based on the total amount of the monomers M-B, is from 0 to 10% by weight, preferably from 0 to 8% by weight, and in particular from 0 to 6.5% by weight.

According to another preferred embodiment of the invention typically at least 95% by weight, preferably at least 98% by weight and in particular at least 99% by weight of the total amount of monomers M4 included in a polymer P in copolymerized form, are part of the monomers M-B forming the first polymer of the polymer P.

In addition to the polymer P, the aqueous binder compositions and the aqueous multistage polymer dispersions, respectively, typically further comprise at least one surface-active substance for the purpose of stabilizing the polymer particles of the polymer P. However, as will be explained in more detail below, for the preparation of the inventive multistage polymer dispersions by emulsion polymerisation only relatively small amounts of these substances are required for stabilisation. The surface-active substances include ionic and nonionic emulsifiers and also ionic and nonionic protective colloids or stabilizers. Emulsifiers, in contrast to protective colloids, are surface-active substances whose molecular weight (numerical average) is situated typically below 2000 g/mol and especially below 1500 g/mol. Protective colloids in turn are typically water-soluble polymers having a number-average molecular weight of more than 2000 g/mol, e.g., in the range from 2000 to 100 000 g/mol, and more particularly in the range from 5000 to 50 000 g/mol. It is of course possible to use protective colloids and emulsifiers in a mixture.

The amount of surface-active substance is typically in the range from 0.001% to 2% by weight, preferably 0.005% to 1% by weight, more preferably 0.01% to 0.5% by weight, and in particular 0.015% to 0.2% by weight, based on 100% by weight of polymer, or on 100% by weight of the monomers M-A and M-B that constitute the polymer P.

The aqueous binder compositions and polymer dispersions according to the invention preferably comprise exclusively emulsifiers as additional surface-active substance. In particular it has been found appropriate for the polymer dispersion to comprise exclusively at least one anionic emulsifier as additional surface-active substances. The emulsifiers are in general not polymerizable—that is, they contain no ethylenically unsaturated groups that are polymerizable in a free-radical polymerization. Part or the entirety of the emulsifiers, however, may be polymerizable. Polymerizable emulsifiers of this kind comprise ethylenically unsaturated groups and are either nonionic or anionic emulsifiers. Polymerizable nonionic emulsifiers are preferably selected from $C_2$-$C_3$ alkoxylates of alkenols, more particularly of prop-2-en-1-ol, and monoesters of monoethylenically unsaturated monocarboxylic or dicarboxylic acids with poly-$C_2$-$C_3$ alkylene ethers, the degree of alkoxylation being usually 3 to 100 in each case. Polymerizable anionic emulsifiers are preferably selected from the corresponding sulfuric and phosphoric monoesters of the aforementioned nonionic polymerizable emulsifiers.

The nonpolymerizable anionic emulsifiers typically include aliphatic carboxylic acids having in general at least 10 C atoms, and also their salts, more particularly their ammonium salts and alkali metal salts, aliphatic, araliphatic, and aromatic sulfonic acids having generally at least 6 C atoms, and also their salts, more particularly their ammonium salts and alkali metal salts, sulfuric monoesters with ethoxylated alkanols and alkylphenols, and also their salts, more particularly their ammonium salts and alkali metal salts, and also alkyl, aralkyl, and aryl phosphates, including phosphoric monoesters of alkanols and alkylphenols.

Examples of suitable anionic emulsifiers are as follows: alkali metal salts and ammonium salts of dialkyl esters of sulfosuccinic acid, alkali metal salts and ammonium salts of alkyl sulfates (alkyl radical: $C_8$ to $C_{18}$), alkali metal salts and ammonium salts of sulfuric monoesters with ethoxylated alkanols (EO degree: 4 to 30, alkyl radical: $C_8$ to $C_{18}$), alkali metal salts and ammonium salts of sulfuric monoesters with ethoxylated alkyl phenols (EO degree: 3 to 50, alkyl radical: $C_4$ to $C_{16}$), alkali metal salts and ammonium salts of alkylsulfonic acids (alkyl radical: $C_8$ to $C_{18}$), and of alkylarylsulfonic acids (alkyl radical: $C_4$ to $C_{18}$). Examples of suitable anionic emulsifiers are also the below-specified compounds of the general formula

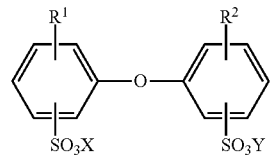

in which $R^1$ and $R^2$ are hydrogen or $C_4$ to $C_{14}$ alkyl and are not simultaneously hydrogen, and X and Y may be alkali metal ions and/or ammonium ions. Preferably $R^1$ and $R^2$ are hydrogen or linear or branched alkyl radicals having 6 to 18 C atoms and more particularly having 6, 12 and 16 C atoms, $R^1$ and $R^2$ not both simultaneously being hydrogen. X and Y are preferably sodium, potassium or ammonium ions, with sodium being particularly preferred. Particularly advantageous compounds are those in which X and Y are sodium, $R^1$ is a branched alkyl radical having 12 C atoms, and $R^2$ is hydrogen or has one of the non-hydrogen definitions stated for $R^1$. Frequently, technical mixtures are used which contain a fraction of 50% to 90% by weight of the monoalkylated product, for example, Dowfax®2A1 (trade mark of the Dow Chemical Company).

Suitable nonionic emulsifiers are typically ethoxylated alkanols having 8 to 36 C atoms in the alkyl radical, ethoxylated mono-, di-, and trialkylphenols having typically 4 to 12 C atoms in the alkyl radicals, the ethoxylated alkanols and alkylphenols typically having a degree of ethoxylation in the range from 3 to 50.

Further suitable emulsifiers are found, for example, in Houben-Weyl, Methoden der organischen Chemie, Volume 14/1, Makromolekulare Stoffe [Macromolecular compounds], Georg Thieme Verlag, Stuttgart, 1961, pp. 192 to 208.

In the aqueous binder compositions and the aqueous polymer dispersions according to the invention, the polymer P is present as a heterogeneous phase in the form of finely divided particles which are dispersed or suspended in a homogeneous aqueous phase. The homogeneous aqueous phase may, besides water and also the auxiliaries that are typically used for the preparation, such as surface-active substances, acids, bases and decomposition products from the polymerization reaction, further comprise small amounts of water-miscible organic solvents. The fraction of the last-mentioned components will typically not exceed 1% by weight, based on the total weight of the dispersion.

The aqueous multistage polymer dispersion of the polymer P is generally obtained in a multistage process comprising two separate polymerisation steps. In the first step, herein also called step A, the first polymer contained in the polymer P is prepared as the direct product of a free-radical aqueous emulsion polymerization of the monomers M-A, and in the second step, herein also called step B, the second polymer contained in the polymer P is prepared as the direct product of a free-radical aqueous emulsion polymerization of the monomers M-B. Alternatively, the first polymer may also be prepared in a solution polymerization or in some other way and then transformed into a so-called secondary dispersion, i.e. the first polymer is suspended or dispersed in an aqueous medium, optionally with removal of organic solvent from the solution polymerization. Preferably, the first polymer and the second polymer are both prepared via free-radical aqueous emulsion polymerizations in step A and step B, respectively. The free-radical aqueous emulsion polymerizations of both steps may be carried out as what is called a miniemulsion polymerization; that is, the monomers for polymerization are used in the form of an aqueous miniemulsion in which the monomer droplets have very small diameters (volume-average droplet diameter of the monomer emulsion <1 µm, more particularly <0.6 µm).

In a preferred embodiment of the invention the aqueous multistage polymer dispersions are obtained by aqueous radical emulsion polymerization of the monomers M-B in the presence of the first polymer, i.e. step B is carried out in the dispersion of the first polymer that is obtained in step A by polymerizing monomers M-A using either an aqueous radical emulsion polymerization or a different kind of polymerization, e.g. solution polymerization, and subsequently dispersing the polymer in an aqueous medium.

Accordingly, in a particularly preferred embodiment the aqueous multistage polymer dispersions of the invention are obtained by sequential aqueous radical emulsion polymerization, herein also called process I, which comprises (1) as step A, an aqueous emulsion polymerization of the monomers M-A to obtain an aqueous dispersion of the first polymer and (2) as step B, an aqueous emulsion polymerization of the monomers M-B in the aqueous dispersion of the first polymer.

The free-radical aqueous emulsion polymerizations in order to prepare the first and second polymers are typically performed in the presence of surface-active substances as described above. In the processes according to the invention it is preferred to use exclusively emulsifiers. More particularly it has been found appropriate to use exclusively at least one anionic emulsifier as additional surface-active substance.

Typically the surface-active substances are used in amounts of 0.001% to 2% by weight, preferably 0.005% to 0.5% by weight, and in particular 0.015% to 0.1% by weight, based on the weight of the monomers M-A+M-B to be polymerized. In step A of the multistage process, if it is performed as a free-radical aqueous emulsion polymerization, surface-active substances are typically used in amounts of 0.01% to 1% by weight, more particularly in amounts of 0.05% to 0.25% by weight, based on the weight of the monomers M-A to be polymerized, whereas in step B, particularly if it is a part of process I, further surface-active substances are typically used in amounts of 0.001% to 0.5% by weight, more particularly in amounts of 0.005% to 0.07% by weight, based on the weight of the monomers M-B to be polymerized.

The multistage process of the invention which requires the emulsion polymerization of the monomers M-B to be carried out in the aqueous dispersion of the first polymer, allows for using comparatively small amounts of additional surface-active substances. Without being bound to theory it is believed that during the polymerization the monomers M-B constituting the second polymer the first polymer functions as a protective colloid that stabilizes the monomer droplets. The low levels of additional surface-active substances required for the multistage polymerization process of the invention therefore are probably mainly due to this stabilizing effect of the first polymer. This effect also explains the fact that the first polymer is predominantly located in the shell and the second polymer predominantly located in the core of the polymer particles of the finally obtained multistage polymer dispersion. For this reason the first polymer is herein also named shell polymer and the second polymer is herein also named core polymer.

The monomers M-B constituting the core polymer include monomers M4, as described in detail herein before. Due to their at least two non-conjugated ethylenically unsaturated double bonds the monomers M4 effect cross-linking of the core polymer which has proven to result in dispersions D and binder compositions of the invention having advantageous properties.

The initiators used for the free-radical emulsion polymerization are typically water-soluble substances that form free radicals.

Water-soluble initiators for the emulsion polymerization are organic or inorganic peroxide compounds, i.e., compounds having at least one peroxide or hydroperoxide group, examples being ammonium salts and alkali metal salts of peroxodisulfuric acid, e.g., sodium peroxodisulfate, or hydrogen peroxide or organic peroxides, e.g., tert-butyl hydroperoxide.

Also suitable are what are called reduction-oxidation (redox) initiator systems. The redox initiator systems are composed of at least one, usually inorganic reducing agent and one organic or inorganic oxidizing agent. The oxidizing component comprises, for example, the peroxide compounds already stated above. The reducing components comprise, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems can be used in combination with soluble metal compounds whose metallic component is able to exist in a plurality of valence states. Typical redox initiator systems are exemplified by ascorbic acid/iron(II) sulfate/sodium peroxodisulfate, tert-butyl hydroperoxide/sodium disulfite, and tert-butyl hydroperoxide/Na hydroxymethanesulfinate. The individual components, the reducing component, for example, may also be mixtures, an example being a mixture of the sodium salt of hydroxymethanesulfinic acid with sodium disulfite.

The stated initiators are used mostly in the form of aqueous solutions, the lower concentration being determined by the amount of water that is acceptable in the dispersion, and the upper concentration by the solubility of the respective compound in water. Generally speaking, the concentration is 0.1% to 30%, preferably 0.5% to 20%, more preferably 2% to 15%, by weight, based on the solution.

The amount of initiator is generally 0.1% to 15% by weight, preferably 1% to 8% by weight, based on the monomers to be polymerized. It is also possible for two or more different initiators to be used for the emulsion polymerization.

In the polymerization it is possible to use regulators, in amounts of 0% to 1% by weight, for example, based on the monomers to be polymerized. By this means the molar mass of the polymer is reduced. Suitability is possessed, for example, by compounds having a thiol group such as tert-butyl mercaptan, mercaptoethanol, thioglycolic acid, ethyl thioglycolate, mercaptopropyltrimethoxysilane, and tert-dodecyl mercaptan. Optionally it is of advantage to add the regulator in the course of the polymerization over a relatively long period, parallel, for example, with the addition of the monomers. The addition may then be made at a continuous feed rate or with an increasing or decreasing feed rate.

According to a preferred embodiment of the invention the polymerization of the shell polymer in step A is carried out in the presence of a regulator, which is preferably used in an amount of 0.1% to 5% by weight and in particular 0.5% to 2.5% by weight, based on monomers M-A.

The polymerizations in steps A and B of the multistage process of the invention are preferably performed as feed processes, i.e., at least 90% of the monomers to be polymerized in each step are added to the polymerization reactor in the course of the polymerization under polymerization conditions. The additions may be made continuously or in stages. In the course of the polymerizations the monomer compositions may be altered once, a number of times or else continuously (gradient procedure).

A preferred procedure in the multistage process of the invention is to introduce an initial charge comprising water and optionally a portion of the total amount of the surface-active substances to be used in the polymerisations of steps A and B. The initial charge is then heated to polymerization temperature, if this has not already taken place, and afterwards typically at least a portion of the polymerization initiator is added, e.g., 10% to 100% and more particularly 50% to 100% by weight, based on the total amount of the initiator to be used for steps A and B. An alternative procedure is to first add at least a portion of the polymerization initiator and then to carry out heating to polymerization temperature. Subsequently, the addition of monomers M-A to the polymerization reactor takes place under polymerization conditions. The addition is performed usually over a relatively long period of usually at least 15 minutes, 15 minutes to 5 hours for example, more particularly over a period of 30 min to 3 h. The addition may be performed with a constant, increasing or decreasing rate of addition. In a first preferred embodiment the addition is made at the beginning of the polymerization with increasing feed rate. In another, likewise preferred embodiment of the process of the invention, the addition is made at a constant rate of addition. The monomers M-A can be added as they are. Preferably, the monomers M-A are added in the form of an aqueous monomer emulsion which typically comprises at least part, preferably at least 20% by weight of the total amount of surface-active substances to be used in the polymerizations of steps A and B. This monomer emulsion typically has a monomer content in the range from 60% to 90% by weight and more particularly in the range from 65% to 85% by weight. It is possible in principle to add the monomers M-A or the emulsion of monomers M-A to the polymerization reactor by way of two or more feeds, in which case the monomer composition of the individual feeds may differ. In general, however, it is sufficient to add the monomers M-A as a mixture via one feed to the polymerization reactor. Where the monomers M-A are added in the form of an aqueous emulsion to the polymerization reactor, it can be of advantage to emulsify the monomers M-A afresh directly before they are added and at the rate at which they are added in the polymerization reactor, by a continuous process, for example. The monomer emulsion can also be first prepared and then introduced at the desired rate of addition into the polymerization reactor. After the addition of monomers M-A is completed the polymerization mixture is usually allowed to afterreact for about 5 minutes to 2 hours at the polymerization temperature, which typically ends the polymerization of step A. Thereafter, followed by an optional addition of water, the polymerization according to step B is effected by adding monomers M-B basically in the same way as described above for monomers M-A.

In parallel to the addition of monomers M-A and/or the addition of monomers M-B a portion or the entirety of the total amount of the polymerization initiator may be added. According to a preferred embodiment of the invention the entirety or a major portion of the initiator, e.g. at least 80% and in particular 85% to 95% of the total amount of the initiator, is charged to the reactor prior of the addition of the monomers M-A. According to a particular preferred embodiment the entirety of the initiator is charged prior to the addition of monomers M-A.

Typically, after the completion of both the polymerization of monomers M-A in step A and the polymerization of monomers M-B in step B, a base is added to the respective polymerization mixture in order to establish a pH-value in a basic range of generally 7.5 to 10.5 and preferably 8.5 to 10. In addition the base may already be fed in parallel to one or both of the feeds including monomers M-A or M-B. Preferred bases in this context are selected from aqueous ammonia (i.e. ammonium hydroxide) and organic amines, such as triethanolamine, diethanolamine or polyethylene amines, such as Jeffamines®. Preferably, besides its additions following the completed polymerizations of steps A and B, the base is also fed in parallel to the feed of monomers M-B.

After the complete amount of the aforementioned base has been charged to the polymerization reactor following the polymerization of monomers M-B, a crosslinking compound devoid of any ethylenically unsaturated double bonds may be added to the polymer dispersion. The crosslinking compound, if used at all, is usually applied in amounts of up to 4 parts per hundred parts by weight of monomer (pphm), preferably up to 2 pphm, for example 0.1 to 4 pphm, in particular 0.5 to 3 pphm and specifically 1 to 2 pphm. A typical crosslinking compound has functional groups matching complementary functional groups included in the polymer, e.g. polymers bearing keto groups may be crosslinked with compounds having two or more hydrazide moieties. Thus, in case the polymer P includes keto groups the crosslinking compound is preferably selected from polyhydrazides and more preferably selected from dihydrazides as described for instance in U.S. Pat. No. 4,931,494, US 2006/247367 or US 2004/143058. In this context particularly preferred dihydrazides are aliphatic dicarboxylic acid dihydrazides, such as adipic acid dihydrazide.

Polymerization temperature and polymerization pressure are of minor importance. The emulsion polymerization takes place typically at temperatures in the range from 30 to 130, preferably in the range from 50 to 100° C. The polymerization pressure is situated customarily in the region of atmospheric pressure, i.e., at ambient pressure, but may also be slightly above or below, in the range, for example, of 800 to 1500 mbar.

The polymerization medium may be composed either just of water or of mixtures of water and water-miscible liquids such as methanol. It is preferred to use just water.

After they have been prepared as described above, the aqueous polymer dispersions of the invention may be further stabilized by addition of an anionic surface-active substance. Preferred for this purpose are the dialkyl esters of sulfosuccinic acid or their salts, more particularly the sodium salts, especially the dialkyl esters of sulfosuccinic acid having 6 to 12 C atoms per alkyl radical. Preferably, however, following the final emulsion polymerization in step B, no such additional anionic surface-active substance is admixed with the aqueous polymer dispersion.

In general the aqueous polymer dispersion will also be stabilized with one or more biocides (preservatives) to counter infestation by microorganisms. These biocides include, for example, alkyl esters of para-hydroxybenzoic acid, sodium benzoate, 2-bromo-2-nitropropane-1,3-diol, ortho-phenylphenol, dichlorophen, benzyl alcohol hemiformal, pentachlorophenol, 2,4-dichlorobenzyl alcohol and also, in particular, substituted isothiazolones such as, for example, $C_1$-$C_{10}$ alkylisothiazolinones, 5-chloro-2-methyl-4-isothiazolinone, and benzoisothiazolinones, examples being the products sold under the names Proxel® from Avecia (or Arch) or Acticide® from Thor Chemie. Preservatives are used typically in amounts from 0.01 to 10 grams per liter of the polymer dispersion.

The solids content of the aqueous polymer dispersions is typically from 20% to 70% by weight, preferably 30% to 55% by weight, and especially from 35% to 50% by weight.

The above-described aqueous multistage polymer dispersions of a polymer P are especially suitable as a binder component in the binder compositions of the invention.

As described above, the inventive binder compositions besides the aqueous multistage dispersion of a polymer P also comprise at least one carbodiimide having at least two carbodiimide moieties, which are bound to an aliphatic carbon atom. Such carbodiimides are herein also called carbodiimides C.

Suitable carbodiimides C are those that are described e.g. in EP 0 198 343, EP 0 965 582, U.S. Pat. No. 5,008,363, U.S. Pat. No. 5,258,481, EP 0 686 626, EP 0 792 908, EP 0 878 496, EP 0 952 146, WO 2007/089142, U.S. Pat. No. 4,820,863, U.S. Pat. No. 5,047,588, U.S. Pat. No. 6,248,819, WO 2005/003204, US 2008/0103266 and EP 0 277 361. Preferred carbodiimides C have from 2 to 20% by weight, in particular from 5 to 15% by weight, of N=C=N moieties, based on the weight of the carbodiimide. In addition, those carbodiimides C are preferred that on average have 2 to 20, more preferably 2 to 10 and in particular 2 to 6 carbodiimide moieties.

According to a preferred embodiment of the invention the carbodiimides C are water-soluble or water-dispersible. Particularly preferred carbodiimides C therefore contain poly-$C_2$-$C_3$-alkylenoxide groups, in particular polyethylene oxide groups, having 2 to 50, specifically 5 to 20 ethylene oxide repeating units.

Furthermore, those carbodiimides C are preferred that are aliphatic, i.e. the carbodiimide moieties of the carbodiimides C are linked by aliphatic diradicals, more preferably by saturated aliphatic diradicals and in particular by diradicals selected from branched or linear $C_2$-$C_{15}$-alkandiyl and $C_4$-$C_8$-cycloalkandiyl which may be substituted with 1 to 5 $C_1$-$C_5$-alkyl groups.

According to another preferred embodiment the carbodiimide C is an aliphatic carbodiimide, which contains repeating units of the formula (B)

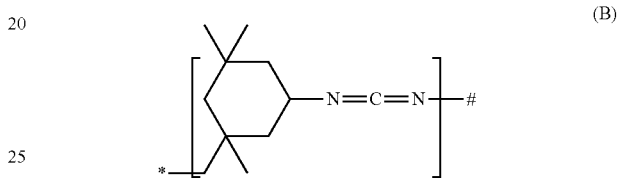

(B)

where * is attached to a nitrogen atom of a carbodiimide moiety or urethane moiety and # is attached to a carbon atom. These compounds are obtainable by self-condensation of isophorone diisocyanate (1-isocyanato-3-isocyanatomethyl-3, 5,5-trimethyl cyclohexane) with loss of carbon dioxide in the presence of a compound bearing a hydroxyl group. This compound bearing a hydroxyl group is typically a poly-$C_2$-$C_3$-alkylene oxide constituting the poly-$C_2$-$C_3$-alkylene oxide group mentioned above that is attached via the aforementioned urethane moiety.

The carbodiimides C and in particular those of the formula (B) may be prepared by the following procedure: A diisocyanate, such as isophorone diisocyanate, and a monohydroxyl poly-$C_2$-$C_3$-alkylene oxide (e.g. methanol-started polyethylene oxide) are mixed in an aprotic solvent and heated to about 100 to 150° C. Then a catalyst, such as 1-methyl-2-phospholen-1-oxide, is added and the mixture is heated for several hours at about 130 to 160° C. Afterwards a scavenger, such as ethanol is added to the reaction mixture in order to quench any remaining isocyanate groups. The product thus obtained can be directly employed as carbodiimide C in the binder composition of the invention.

The amount of carbodiimide C comprised in the binder compositions of the invention is generally 0.1 to 30% by weight, preferably 0.2 to 20% by weight, and especially 0.1 to 10% by weight, with respect to the polymer P.

For the advantageous effect of carbodiimide C, the pH-value of the binder composition of the invention is typically set in the range of 7.5 to 10.5 and particularly in the range of 8.5 to 10. Such basic pH-values are preferably established by adding an amine, such as in particular aqueous ammonium hydroxide, to the aqueous multistage polymer dispersion.

The carbodiimide C may be added before, during or after one of the polymerization steps of the polymer P. Alternatively, it may also be added during the preparation of the binder composition.

For preparing an aqueous binder composition, the carbodiimide C is added preferably to a polymer dispersion of the polymer P in the form of a dispersion or a solution, and is distributed uniformly therein.

The combination of carbodiimides C with polymers P provides the binder composition of the invention with properties that are advantageous for different fields of application. For example, the binder compositions as constituents of coating compositions, enhance the flexibility of the resulting coatings, without adversely affecting their resistance to water and chemicals. In contrast to other carbodiimide containing coating composition those according to the invention not only feature considerably easier processing as their viscosities at basic pH values are lower and pot-lives are longer, but also contain less surface-active substances. Moreover, compared to common binders based on epoxide or polyurethane resins, the inventive binder compositions are superior due to their lower levels of undesired solvents and reactive components. Overall, the use of the binder compositions of the invention in paints and varnishes allows for high-quality coatings with a generally good to excellent adhesion to a variety of surfaces.

How the advantageous effects of the carbodiimides C at a molecular level may be explained is of secondary importance for the invention. Nevertheless, it is thought that carbodiimides C enter into covalent interactions with the carboxyl groups of the polymer P, similarly to what is described e.g. by J. W. Taylor and D. R. Bassett, in E. J. Glass (Ed.), Technology for Waterborne Coatings, ACS Symposium Series 663, Am. Chem. Soc., Washington, D.C., 1997, chapter 8, pages 137 to 163). It is therefore assumed that these interactions are based primarily on the reactions of the carbodiimide moieties of carbodiimide C with the carboxyl groups of polymer P that result in N-acyl urea bonds. A carbodiimide C molecule, accordingly, is able to interact with two or more carboxyl groups of the polymer P and hence develop a crosslinking action. The inventive multistage polymer dispersions are distinguished from comparable dispersions of the prior art in that their polymers P have much lower levels of carboxyl groups, i.e. much lower acid numbers, as explained above. The binder compositions of the invention prepared from these dispersions therefore require substantially smaller amounts of carbodiimide than known binders based on the prior art dispersions with higher acid numbers. It is thought that said reduced amounts of carbodiimide and low acid numbers of polymers P also account for the aforementioned advantageous properties of the binder compositions of the invention as well as of the polymer films obtainable therefrom. Thus, for example, it is possible to imagine that the high strength combined with high flexibility of the polymer films formed from the binders of the invention derive from a smooth film formation process that mainly takes place after the coating film has been applied to a surface. This is in contrast to the aforementioned known binders with high amounts of carbodiimides and polymers having high acid numbers, which tend to rapid film formation resulting in poorly adhered and brittle coatings. In this respect, the inventive binder compositions first lead to coatings having advantageous strength and hardness, by virtue of the crosslinking, and second to good adhesion, high flexibility and low susceptibility to fracture, by virtue of the slowed down film formation process. The slow film formation in turn is due to the low concentrations of crosslinking functional groups, namely the carbodiimide moieties and the carboxyl groups. This is manifested, for example, in coatings that feature high hardness and good scratch resistance while also adhering well to the surfaces they have been applied to and having a high flexibility. Presumably also owing to the mentioned low concentration of the crosslinking functional groups the binder compositions of the invention have prolonged pot-lives and low viscosities at basic pH values.

The performance properties of coating films based on the binder compositions of the invention can be modified by varying the amount of carbodiimide C. For example, by optimizing the amount of carbodiimide C, it is possible to maximize a specific property of coating materials, such as the adhesion of the coating to the substrate, for instance, or a weighting of different properties, such as adhesion hardness, for instance, can be performed in accordance with the requirements.

The binder compositions of the invention are suitable for a multiplicity of applications in which aqueous polymer dispersions are typically used as binders, e.g., coating materials, such as, for example, in paints for internal and external applications, in paper coating slips, in leather and textile coating systems, in printing inks, in coating systems for mineral moldings, in primers for coating metals, as binders in the production of polymer-bonded nonwoven fabrics, as base materials for adhesive, as additives for inorganic, hydraulic binders, such as $CaSO_4.0.5H_2O$, anhydrite or cement and for the hydraulically setting compositions produced therefrom such as plaster or concrete, as additives for clay or loam construction materials, for producing membranes, and the like.

The aqueous binder compositions of the invention are employed preferably in aqueous surface coating materials. Accordingly, the present invention further provides for the use of the here-described binder compositions in coating compositions, herein also called surface coating formulations and surface coating materials.

In another preferred embodiment of the present invention the aqueous binder compositions of the invention can be employed in aqueous filler coating materials. These filler coating materials can be employed as a coating layer between primer and surface coating, between primer and basecoat, between primer and top coat or as the primer itself, respectively. Instead of a primer also a cathodic electrodeposition can be applied.

Alternatively, the filler function and the base coat function can also be combined in a single functional layer, as for example described in WO 03/025076. In one embodiment the single functional layer comprises
a) 10 to 60% by weight of at least one binder composition of the invention (polymer content 40 to 75% by weight),
b) 0 to 20% by weight of at least one binder polymer, different from the polymer of binder composition a),
c) 0 to 5% by weight of at least one crosslinking binder,
d) 1 to 30% by weight of at least one pigment and/or effect-imparting component,
e) 0 to 20% by weight filler,
f) 0 to 8% by weight additives,
g 0 to 18% by weight co-solvents and
h) water to 100% by weight.

Besides the binder compositions, the filler coating material as well as the surface coating formulations may comprise further adjuvants, of the kind typical in filler and surface coating materials based on aqueous polymer dispersions. These adjuvants include pigments, fillers, further auxiliaries, and, if appropriate, additional film-forming polymers.

Suitable pigments are, for example, inorganic white pigments such as titanium dioxide, preferably in the rutile form, barium sulfate, zinc oxide, zinc sulfide, basic lead carbonate, antimony trioxide, lithopones (zinc sulfide+barium sulfate) or colored pigments, examples being iron oxides, carbon black, graphite, zinc yellow, zinc green, ultramarine, manganese black, antimony black, manganese violet, Paris blue or Schweinfurt green. As well as the inorganic pigments, the emulsion paints of the invention may also comprise organic color pigments, examples being sepia, gamboge, Cassel brown, toluidine red, parared, Hansa yellow, indigo, azo dyes, anthraquinonoid and indigoida dyes, and also dioxazine, quinacridone, phthalocyanine, isoindolinone, and metal-complex pigments. Also suitable are synthetic white pigments with air inclusions for increasing the light scattering, such as the Rhopaque® dispersions.

Suitable fillers are, for example, aluminosilicates, such as feldspars, silicates, such as kaolin, talc, mica, magnesite, alkaline earth metal carbonates, such as calcium carbonate, in the form of calcite or chalk, for example, magnesium carbonate, dolomite, alkaline earth metal sulfates, such as calcium sulfate, silicon dioxide, etc. In filler coating materials as well as in surface coating materials, of course, finely divided fillers are preferred. The fillers can be used as individual components. In actual practice, however, filler mixtures have been found particularly appropriate, examples being calcium carbonate/kaolin, and calcium carbonate/talc. Glossy surface coating materials generally include only small amounts of very finely divided fillers, or comprise no fillers.

Finely divided fillers may also be used to increase the hiding power and/or to save on white pigments. In order to adjust the hiding power, the hue, and the depth of color, it is preferred to use blends of color pigments and fillers.

The typical auxiliaries, besides the emulsifiers used in the polymerization, also include wetting agents or dispersants, such as sodium, potassium or ammonium polyphosphates, alkali metal salts and ammonium salts of acrylic acid or maleic anhydride copolymers, polyphosphonates, such as sodium 1-hydroxyethane-1,1-diphosphonate, and salts of naphthalenesulfonic acids, more particularly their sodium salts.

In the case of filler coating materials the coating composition may further comprise at least one corrosion inhibitor.

Further suitable auxiliaries are flow control agents, defoamers, biocides, thickeners, and film-forming assistants. Examples of suitable thickeners are associative thickeners, such as polyurethane thickeners. The amount of the thickener is preferably less than 1% by weight, more preferably less than 0.6% by weight, based on the solids content of the surface coating material. Suitable film-forming assistants are, in particular, organic solvents which lower the film-forming temperature of the coating material. They include, in particular, aromatic and aliphatic hydrocarbon solvents and aliphatic esters, especially dialkyl dicarboxylates, the film-forming agents typically having boiling points (under atmospheric pressure) in the range from 80 to 250° C. and being used in an amount of 0.5% to 10% by weight, based on the polymer P.

The fraction of pigments may be described through the pigment volume concentration (PVC). The PVC describes the ratio of the volume of pigments ($V_P$) and fillers ($V_F$) to the total volume, consisting of the volumes of binder ($V_B$), pigments, and fillers in a dried coating film, in percent: PVC= $(V_P+V_F) \times 100/(V_P+V_F+V_B)$ (cf. Ullmann's Enzyklopädie der technischen Chemie, $4^{th}$ edition, Volume 15, p. 667). Surface coating materials can be divided up according to the PVC, for example, as follows:

| | |
|---|---|
| highly filled interior paint, wash resistant, white/matt | about ≥85 |
| interior paint, scrub resistant, white/matt | about 60-85 |
| semigloss paint, silk-matt | about 30-60 |
| semigloss paint, silk-gloss | about 25-35 |
| gloss paint | about 15-25 |
| exterior masonry paint, white | about 45-55 |
| clear varnish | 0 |

The surface coating materials of the invention can take the form, for example, of an unpigmented system (clear varnish) or of a pigmented system.

One subject of the invention concerns a surface coating material in the form of an aqueous composition comprising:
  at least one binder composition of the invention,
  at least one inorganic filler and/or at least one inorganic pigment,
  at least one typical auxiliary, and
  water.

Preference is given to a surface coating material comprising:
  10 to 60% by weight of at least one binder composition of the invention (polymer content 40 to 75% by weight),
  10 to 70% by weight of inorganic fillers and/or inorganic pigments,
  0.1 to 20% by weight of typical auxiliaries, and
  water to 100% by weight.

One embodiment of the present invention is surface coating materials in the form of an emulsion paint. Emulsion paints generally comprise 30 to 75% by weight and preferably 40 to 65% by weight of nonvolatiles. By these are meant all constituents of the formulation that are not water, but at least the total weight of binder, filler, pigment, low-volatility solvents (boiling point above 220° C.), plasticizers for example, and polymeric auxiliaries. Of these figures, the amounts accounted for by each of the constituents are as follows:
  a) 3 to 90% by weight, more particularly 10% to 60% by weight of the polymer dispersion (PD) of the invention (polymer content 40 to 75% by weight),
  b) 0 to 85% by weight, preferably 5 to 60% by weight, more particularly 10 to 50% by weight of at least one inorganic pigment,
  c) 0 to 85% by weight, more particularly 5 to 60% by weight of inorganic fillers, and
  d) 0.1 to 40% by weight, more particularly 0.5 to 20% by weight of typical auxiliaries.

The binder compositions of the invention are especially suitable for producing masonry paints having a PVC in the range from 30 to 65 or interior paints having a PVC in the range from 65 to 80. In addition, they are especially suitable for producing semigloss or gloss paints which have, for example, a PVC in the range from 12 to 35, preferably 15 to 30.

The surface coating materials of the invention are produced in a known way by blending the components in mixing apparatus customary for the purpose. It has been found appropriate to prepare an aqueous paste or dispersion from the pigments, water, and, optionally, the auxiliaries, and only then to mix the polymeric binder, i.e., in general, the aqueous dispersion of the polymer, with the pigment paste or pigment dispersion.

In case of a filler coating material in the form of an aqueous composition the coating composition comprises
  at least one binder composition of the invention,
  at least one inorganic filler,
  optionally at least one organic or inorganic, preferably inorganic pigment,
  at least one typical auxiliary, and
  water.

In one embodiment of the invention the coating composition of the invention or the filler coating material of the invention comprises at least one additional binder selected from the group consisting of polyurethane binders, polyester binders and aldehyde resins, e.g. based on isobutyraldehyd such as Laropal® LR 8991 or Laropal® LR 9008. The additional binder can be used in amounts of e.g. 0 to 20% by weight or from 1 to 15% by weight.

Preference is given to a filler coating material comprising:
- 10 to 60% by weight of at least one binder composition of the invention (polymer content 40 to 75% by weight) or of at least one binder composition of the invention and at least one additional binder,
- 10 to 50%, preferably 10 to 20% by weight of inorganic fillers and optionally pigments,
- 0.1 to 20% by weight of typical auxiliaries, and
- water to 100% by weight.

In the case of high solids filler coating materials the coating composition may contain 50 to 65% by weight of inorganic fillers and optionally pigments.

In a preferred embodiment it is possible to include the amounts of pigments as described for the surface coating materials above as well as filler materials in the filler coating composition, so that the basecoat may be applied thinner as usual onto such filler coating layers or is even dispensable.

The filler coating material and surface coating material of the invention can be applied to substrates in a usual way, as for example by spreading, spraying, dipping, rolling, knifecoating, etc.

In the case of primer coating materials the coating layer may be applied on the substrate in a dry thickness of from 25 to 250 μm. In particular cases it may also be possible to apply the primer coating materials in thinner layers.

In the case of surface coating materials the coating layer may be applied onto the existing coating layer in a dry thickness of from 25 to 120 μm. In the case of direct-to-metal coating the thickness of the coating layer may be up to 200 μm. In particular cases it may also be possible to apply the surface coating materials in thicker layers.

In the case of filler coating materials the coating layer may be applied onto the existing coating layer in a dry thickness of from 20 to 500 μm, preferably from 50 to 350 μm and more preferably from 50 to 250 μm. In particular cases it may also be possible to apply the filler coating materials in thicker layers.

It is an advantage of the binder compositions of the invention that they do not react with atmospheric moisture, as e.g. coatings based on isocyanates do, and, therefore, do not evolve carbon dioxide which results in gas bubbles in the coatings (also known as "popping").

After application the coating materials according to the invention are usually dried under conditions suitable for at least partial removal of water.

Typical condition range from 24 hours at room temperature to 30 seconds at 200° C., preferably from 12 hours at 40° C. to 5 minutes at 160° C.

It is an advantage of the binder compositions of the invention that they are partially cured upon drying. On physical drying the binder compositions tend to partially crosslink so that it is not necessary to cure each intermediate coating layer but it is usually sufficient to finally cure the coating after application and drying of each intermediate layer.

Curing conditions range from 1 week at room temperature to 30 minutes at 160° C.

The surface coating material of the invention is used preferably as an architectural coating material, i.e., to coat buildings or parts of buildings. The substrates in question may be mineral substrates such as renders, plaster or plasterboard, masonry or concrete, fibrous cement sheets, wood, wood base materials, metal or paper, wallpapers for example, or plastic, PVC for example.

The surface coating materials of the invention are notable for ease of handling, good processing properties, and high hiding power. Moreover, the pollutant content of the surface coating materials is low. They have good performance properties, such as good resistance to water and chemicals, good wet adhesion, good blocking resistance, good recoatability, for example, and exhibit good flow on application. The surface coating materials are also suitable for producing anticorrosive coatings.

The coatings produced from the surface coating materials of the invention feature a combination of good adhesion with good abrasion resistance. Said coatings, moreover, generally feature high flexibility and low fragility, which allows them, for example, to conform to a working substrate.

The examples which follow serve to illustrate the invention.

I ANALYSIS

Determination of the Average Particle Diameter

The average particle diameter was determined by means of photon correlation spectroscopy (PCS), also known as quasielastic light scattering (QELS) or dynamic light scattering. The measurement method is described in the ISO13321 standard. The determination was carried out using an HPPS (High Performance Particle Sizer). For this purpose, a highly diluted aqueous polymer dispersion (c~0.005%) was analyzed. Measurement configuration: HPPS from Malvern, automated, with continuous-flow cuvette and Gilson autosampler. Parameters: measurement temperature 22.0° C.; measurement time 120 seconds (6 cycles each of 20 s); scattering angle 173°; wavelength laser 633 nm (HeNe); refractive index of medium 1.332 (aqueous); viscosity 0.9546 mPa·s. The measurement gave an average value of the cumulant analysis (mean of fits). The mean of fits is an average, intensity-weighted particle diameter in nm, which corresponds to the volume-average or mass-average particle diameter.

The weight-average particle diameter was determined by HDC (Hydrodynamic Chromatography fractionation), as for example described by H. Wiese, "Characterization of Aqueous Polymer Dispersions" in Polymer Dispersions and Their Industrial Applications (Wiley-VCH, 2002), pp. 41-73. Measurements were carried out using a PL-PSDA particle size distribution analyzer (Polymer Laboratories, Inc.). A small amount of sample was injected into an aqueous eluent containing an emulsifier, resulting in a concentration of approx. 0.5 g/l. The mixture is pumped through a glass capillary tube of approx. 15 mm diameter packed with polystyrene spheres. As determined by their hydrodynamic diameter, smaller particles can sterically access regions of slower flow in capillaries, such that on average the smaller particles experience slower elution flow. The fractionation was finally monitored using an UV-detector which measured the extinction at a fixed wavelength of 254 nm.

The average particle diameters can alternatively be determined by the method described by H. Cölfen, "Analytical Ultracentrifugation of Nanoparticles", in Encyclopedia of Nanoscience and Nanotechnology, (American Scientific Publishers, 2004), pp. 67-88. For this purpose an investigation is carried out at 23° C. on a 0.1 to 0.5% by weight dilution (relative to solids content; light transmittance about 10%) of the polymer dispersion by means of an ultracentrifuge (Beckmann Model XL type) in a sedimentation field ramp from 600 to 40 000 rpm in accordance with an acceleration of 2250 to 150 000 g using a turbidity-based optical system (see also W. Mächtle and L. Börger in "Analytical Ultracentrifugation of Polymers and Nanoparticles", (Springer, Berlin, 2006), W. Mächtle in Analytical Ultracentrifugation in Biochemistry and Polymer Science: S. E. Härting et al. (editors), Cambridge: Royal Society of Chemistry, 1992, pp. 147-175, and in W. Mächtle, Makromolekulare Chemie 185 (1984), pages 1025-1039). The diluent used was $D_2O$ with about 0.1 to 0.5 g/l, e.g., 0.5 g/l of Emulgator K30 (emulsifier: sodium salt of an alkanesulfonate).

Determination of Molar Masses and the Molar Weight Distribution

The molar masses and the molar weight distribution can be determined by gel permeation chromatography (GPC), also known as size exclusion chromatography (SEC), as described for example by H. Wiese, "Characterization of Aqueous Polymer Dispersions" in Polymer Dispersions and Their Industrial Applications (Wiley-VCH, 2002), pp. 41-73. The polymer is dissolved in an organic solvent, for example THF, and then fractionated according to coil sizes by passing it through a micro-porous gel with defined pore size distribution. For example, 10 μm PLgel Mixed Bed columns (Agilent Technologies, 7.5×300 mm) containing a crosslinked polystyrene/divinylbenzene matrix can be used, allowing to separate substrates in the range of 500 to 10,000,000 g/mol at a column temperature of 35° C. The calibration can be carried out using polystyrene standards, as for example available from Polymer Laboratories, with molecular weights from 580 to 7,500,000 g/mol, as well as hexyl benzene (162 g/mol) and by extrapolating values occurring outside this range. The detection of polymer fractions can be carried out using refractive index or UV detectors, for example a DRI Agilent 1100 detector at 254 nm.

Determination of the Viscosity

The Brookfield viscosity was determined by a method based on DIN EN ISO 3219, using a rotational viscometer (Physica MCR 301 rheometer with sample changer and CC27 measuring system from Anton Paar) at 23° and a shear rate of 0 to 500 sec$^{-1}$). The figures given are the values at 100 sec$^{-1}$ and 250 sec$^{-1}$, as indicated.

Determination of the Minimum Film Forming Temperature (MFFT)

The MFFT is determined according to ISO 2115 by spreading the dispersion at a defined layer thickness (for example at 200 μm wet) on a cooled/heated plate along which a temperature gradient is established (for example from 0 to 40° C.). After complete drying in a controlled atmospheric environment, the film is visually examined for cracks. The MFFT is defined as the lowest temperature at which a homogeneous and crack-free film is formed.

Determination of the Glass Transition Temperature ($T_g$)

The $T_g$ is determined by Differential Scanning calorimetry (DSC) according to ISO 11357-1. This method involves monitoring the difference between the heat absorbed per unit time by the polymer film and the heat absorbed by a thermally inert reference material during a linear temperature ramp. The sample of interest and the reference are placed on sensor plates of defined thermal resistance R, and the temperature difference DT between both of them is then monitored over the temperature ramp. The heat flow difference (which is the negative quotient of DT and R) is then plotted as a function of temperature. Above Tg, the glassy polymer film becomes viscous or rubber like, which is caused by the polymer chains becoming mobile. This glass transition of a polymer usually occurs around a wide temperature range and becomes visible as the rate of the heat flow difference increases over that temperature range. The Tg is finally determined by the midpoint of the area of increased heat flow difference.

II PREPARATION OF THE POLYMER DISPERSIONS

Example 1

Dispersion D1

A polymerization vessel equipped with metering apparatus, stirrer, and temperature regulation was charged at 20 to 25° C. (room temperature) under a nitrogen atmosphere with the initial charge (see below) which was then heated to 80° C. with stirring (150 rpm). When this temperature was reached, 25.71 g of a 7% strength by weight aqueous solution of sodium peroxodisulfate were added and the batch was stirred for two minutes. Then, with the temperature maintained, feed Z1 was metered in continuously over the course of 40 minutes at a constant flow rate. After the end of the addition of feed Z1, rinse water 1 was added to the polymerization mixture. The polymerization mixture was then afterreacted at 80° C. for 10 minutes. Subsequently feed Z3 were metered continuously into the polymerization mixture over the course of 10 minutes with a constant flow rate. After that, over the course of 90 minutes, with a constant flow rate, feed Z2 was metered in continuously. 40 minutes after the beginning of feed Z2, and in parallel with the ongoing feed Z2, feed Z4 was metered into the polymerization mixture over the course of 10 minutes, continuously and with a constant flow rate. After the end of feed Z2, rinse water 2 was added to the polymerization mixture. Thereafter the polymerization mixture was afterreacted at 80° C. for 90 minutes more. After that, feed Z5 was metered into the polymerization mixture over the course of 10 minutes, continuously and with a constant flow rate. The aqueous polymer dispersion obtained, after cooling it to room temperature, was then mixed with rinse water 3 and filtered through a 125 μm filter.

Initial charge:

| | |
|---|---|
| 290.93 g | deionized water |
| 12.00 g | 15% strength by weight aqueous solution of sodium lauryl sulfate, |

Feed Z1 (homogeneous mixture of):

| | |
|---|---|
| 76.21 g | deionized water |
| 3.00 g | 15% strength by weight aqueous solution of sodium lauryl sulfate |
| 2.16 g | 2-ethylhexyl thioglycolate |
| 2.03 g | acrylic acid |
| 8.78 g | hydroxyethyl methacrylate |
| 13.50 g | n-butyl acrylate |
| 13.50 g | styrene |
| 97.20 g | methyl methacrylate |

Rinse water 1:

| | |
|---|---|
| 12.00 g | deionized water |

Feed Z2 (homogeneous mixture of):

| | |
|---|---|
| 124.41 g | deionized water |
| 6.00 g | 15% strength by weight aqueous solution of sodium lauryl sulfate |
| 18.00 g | 1,4-butanediol diacrylate |
| 162.00 g | n-butyl acrylate |
| 135.00 g | methyl methacrylate |

Feed Z3:

| 1.80 g | 3% strength by weight aqueous ammonia solution |
|---|---|

Feed Z4:

| 2.40 g | 3% strength by weight aqueous ammonia solution |
|---|---|

Rinse water 2:

| 12.00 g | deionized water |
|---|---|

Feed Z5:

| 28.08 g | 5% strength by weight aqueous ammonia solution |
|---|---|

Rinse water 3:

| 38.84 g | deionized water |
|---|---|

This gave a polymer dispersion having a solids content of 42.0% by weight, a pH of 9.5, an average particle size of 66 nm (determined by means of HPPS) and a weight-average particle diameter of 53 nm (determined by means of HDC). The Brookfield viscosity was 155 mPa·s at 100 s$^{-1}$ and 100 mPa·s at 250 s$^{-1}$, respectively. The glass transition temperatures were 18° C. and 89° C. (determined by DSC) and the minimum film forming temperature was 27° C.

Example 2

Dispersion D2

Preparation took place as described for example 1 with the exception that after cooling to room temperature following feed Z5 the additional feed Z6 was metered in and the thus obtained aqueous polymer dispersion was then mixed with rinse water 3 and filtered through a 125 μm filter. The following feeds and rinse waters were used instead of those given in example 1:

Initial charge:

| 290.93 g | deionized water |
|---|---|
| 12.00 g | 15% strength by weight aqueous solution of sodium lauryl sulfate, |

Feed Z1 (homogeneous mixture of):

| 33.00 g | deionized water |
|---|---|
| 3.00 g | 15% strength by weight aqueous solution of sodium lauryl sulfate |
| 2.16 g | 2-ethylhexyl thioglycolate |
| 54.00 g | 20% strength by weight aqueous solution of diacetone acrylamide |
| 2.03 g | acrylic acid |
| 8.78 g | hydroxyethyl methacrylate |
| 13.50 g | n-butyl acrylate |
| 13.50 g | styrene |
| 86.40 g | methyl methacrylate |

Rinse water 1:

| 12.00 g | deionized water |
|---|---|

Feed Z2 (homogeneous mixture of):

| 124.42 g | deionized water |
|---|---|
| 6.00 g | 15% strength by weight aqueous solution of sodium lauryl sulfate |
| 18.00 g | allyl methacrylate |
| 162.00 g | n-butyl acrylate |
| 135.00 g | methyl methacrylate |

Feed Z3:

| 1.80 g | 3% strength by weight aqueous ammonia solution |
|---|---|

Feed Z4:

| 2.40 g | 3% strength by weight aqueous ammonia solution |
|---|---|

Rinse water 2:

| 12.00 g | deionized water |
|---|---|

Feed Z5:

| 28.08 g | 5% strength by weight aqueous ammonia solution |
|---|---|

Feed Z6:

| 45.00 g | 12% strength by weight aqueous solution of adipic acid dihydrazide |
|---|---|

Rinse water 3:

| 6.62 g | deionized water |
|---|---|

This gave a polymer dispersion having a solids content of 42.2% by weight, a pH of 9.6, an average particle size of 72 nm (determined by means of HPPS) and a weight-average particle diameter of 59 nm (determined by means of HDC). The Brookfield viscosity was 80 mPa·s at 100 s$^{-1}$ and 62 mPa·s at 250 s$^{-1}$, respectively. The glass transition temperatures were 25° C. and 87° C. (determined by DSC) and the minimum film forming temperature was 43° C.

Example 3

Dispersion D3

Preparation took place as described for example 1 with the exception that after cooling to room temperature following feed Z5 the additional feed Z6 was metered in and the thus obtained aqueous polymer dispersion was then mixed with rinse water 3 and filtered through a 125 μm filter. The following feeds and rinse waters were used instead of those given in example 1:

Initial charge:

| | |
|---|---|
| 290.93 g | deionized water |
| 12.00 g | 15% strength by weight aqueous solution of sodium lauryl sulfate, |

Feed Z1 (homogeneous mixture of):

| | |
|---|---|
| 33.00 g | deionized water |
| 3.00 g | 15% strength by weight aqueous solution of sodium lauryl sulfate |
| 2.16 g | 2-ethylhexyl thioglycolate |
| 54.00 g | 20% strength by weight aqueous solution of diacetone acrylamide |
| 2.03 g | acrylic acid |
| 8.78 g | hydroxyethyl methacrylate |
| 13.50 g | n-butyl acrylate |
| 13.50 g | styrene |
| 86.40 g | methyl methacrylate |

Rinse water 1:

| | |
|---|---|
| 12.00 g | deionized water |

Feed Z2 (homogeneous mixture of):

| | |
|---|---|
| 124.42 g | deionized water |
| 6.00 g | 15% strength by weight aqueous solution of sodium lauryl sulfate |
| 18.00 g | 1,4-butanediol diacrylate |
| 162.00 g | n-butyl acrylate |
| 135.00 g | methyl methacrylate |

Feed Z3:

| | |
|---|---|
| 1.80 g | 3% strength by weight aqueous ammonia solution |

Feed Z4:

| | |
|---|---|
| 2.40 g | 3% strength by weight aqueous ammonia solution |

Rinse water 2:

| | |
|---|---|
| 12.00 g | deionized water |

Feed Z5:

| | |
|---|---|
| 28.08 g | 5% strength by weight aqueous ammonia solution |

Feed Z6:

| | |
|---|---|
| 45.00 g | 12% strength by weight aqueous solution of adipic acid dihydrazide |

Rinse water 3:

| | |
|---|---|
| 6.62 g | deionized water |

This gave a polymer dispersion having a solids content of 42.2% by weight, a pH of 9.5, an average particle size of 69 nm (determined by means of HPPS) and a weight-average particle diameter of 56 nm (determined by means of HDC). The Brookfield viscosity was 148 mPa·s at $100\ s^{-1}$ and 95 mPa·s at $250\ s^{-1}$, respectively. The glass transition temperatures were 15° C. and 86° C. (determined by DSC) and the minimum film forming temperature was 24° C.

Example 4

Dispersion D4

Preparation took place as described for example 1 with the exception that after cooling to room temperature following feed Z5 the additional feed Z6 was metered in and the thus obtained aqueous polymer dispersion was then mixed with rinse water 3 and filtered through a 125 μm filter. The following feeds and rinse waters were used instead of those given in example 1:

Initial charge:

| | |
|---|---|
| 290.93 g | deionized water |
| 12.00 g | 15% strength by weight aqueous solution of sodium lauryl sulfate, |

Feed Z1 (homogeneous mixture of):

| | |
|---|---|
| 33.00 g | deionized water |
| 3.00 g | 15% strength by weight aqueous solution of sodium lauryl sulfate |
| 2.16 g | 2-ethylhexyl thioglycolate |
| 54.00 g | 20% strength by weight aqueous solution of diacetone acrylamide |
| 2.03 g | acrylic acid |
| 8.78 g | hydroxyethyl methacrylate |
| 13.50 g | n-butyl acrylate |
| 13.50 g | styrene |
| 86.40 g | methyl methacrylate |

Rinse water 1:

| | |
|---|---|
| 12.00 g | deionized water |

Feed Z2 (homogeneous mixture of):

| | |
|---|---|
| 124.42 g | deionized water |
| 6.00 g | 15% strength by weight aqueous solution of sodium lauryl sulfate |
| 9.00 g | glycidyl methacrylate |
| 18.00 g | 1,4-butanediol diacrylate |
| 208.80 g | n-butyl acrylate |
| 79.20 g | methyl methacrylate |

Feed Z3:

| | |
|---|---|
| 1.80 g | 3% strength by weight aqueous ammonia solution |

Feed Z4:

| | |
|---|---|
| 2.40 g | 3% strength by weight aqueous ammonia solution |

Rinse water 2:

| 12.00 g | deionized water |
|---|---|

Feed Z5:

| 28.08 g | 5% strength by weight aqueous ammonia solution |
|---|---|

Feed Z6:

| 45.00 g | 12% strength by weight aqueous solution of adipic acid dihydrazide |
|---|---|

Rinse water 3:

| 6.62 g | deionized water |
|---|---|

This gave a polymer dispersion having a solids content of 42.4% by weight, a pH of 9.5, an average particle size of 73 nm (determined by means of HPPS) and a weight-average particle diameter of 56 nm (determined by means of HDC). The Brookfield viscosity was 150 mPa·s at 100 s$^{-1}$ and 94 mPa·s at 250 s$^{-1}$, respectively. The glass transition temperatures were −6° C. and 88° C. (determined by DSC) and the minimum film forming temperature was 8° C.

Example 5

Dispersion D5

Preparation took place as described for example 1 with the exception that after cooling to room temperature following feed Z5 the additional feed Z6 was metered in and the thus obtained aqueous polymer dispersion was then filtered through a 125 μm filter. The following feeds and rinse waters were used instead of those given in example 1:

Initial charge:

| 290.93 g | deionized water |
|---|---|
| 12.00 g | 15% strength by weight aqueous solution of sodium lauryl sulfate, |

Feed Z1 (homogeneous mixture of):

| 44.00 g | deionized water |
|---|---|
| 3.90 g | 15% strength by weight aqueous solution of sodium lauryl sulfate |
| 2.88 g | 2-ethylhexyl thioglycolate |
| 72.00 g | 20% strength by weight aqueous solution of diacetone acrylamide |
| 2.70 g | acrylic acid |
| 11.70 g | hydroxyethyl methacrylate |
| 18.00 g | n-butyl acrylate |
| 18.00 g | styrene |
| 115.20 g | methyl methacrylate |

Rinse water 1:

| 12.00 g | deionized water |
|---|---|

Feed Z2 (homogeneous mixture of):

| 93.44 g | deionized water |
|---|---|
| 5.10 g | 15% strength by weight aqueous solution of sodium lauryl sulfate |
| 15.44 g | 1,4-butanediol diacrylate |
| 138.87 g | n-butyl acrylate |
| 115.70 g | methyl methacrylate |

Feed Z3:

| 2.55 g | 3% strength by weight aqueous ammonia solution |
|---|---|

Feed Z4:

| 3.00 g | 3% strength by weight aqueous ammonia solution |
|---|---|

Rinse water 2:

| 12.00 g | deionized water |
|---|---|

Feed Z5:

| 29.43 g | 5% strength by weight aqueous ammonia solution |
|---|---|

Feed Z6:

| 60.00 g | 12% strength by weight aqueous solution of adipic acid dihydrazide |
|---|---|

This gave a polymer dispersion having a solids content of 42.1% by weight, a pH of 9.5, an average particle size of 64 nm (determined by means of HPPS) and a weight-average particle diameter of 54 nm (determined by means of HDC). The Brookfield viscosity was 141 mPa·s at 100 s$^{-1}$ and 92 mPa·s at 250 s$^{-1}$, respectively. The glass transition temperatures were 16° C. and 90° C. (determined by DSC) and the minimum film forming temperature was 33° C.

Example 6

Dispersion D6

Preparation took place as described for example 1 with the exception that after cooling to room temperature following feed Z5 the additional feed Z6 was metered in and the thus obtained aqueous polymer dispersion was then mixed with rinse water 3 and filtered through a 125 μm filter. The following feeds and rinse waters were used instead of those given in example 1:

Initial charge:

| 290.93 g | deionized water |
|---|---|
| 12.00 g | 15% strength by weight aqueous solution of sodium lauryl sulfate, |

Feed Z1 (homogeneous mixture of):

| | |
|---|---|
| 30.06 g | deionized water |
| 3.00 g | 15% strength by weight aqueous solution of sodium lauryl sulfate |
| 54.00 g | 20% strength by weight aqueous solution of diacetone acrylamide |
| 2.03 g | acrylic acid |
| 8.78 g | hydroxyethyl methacrylate |
| 13.50 g | n-butyl acrylate |
| 13.50 g | styrene |
| 86.40 g | methyl methacrylate |

Rinse water 1:

| | |
|---|---|
| 12.00 g | deionized water |

Feed Z2 (homogeneous mixture of):

| | |
|---|---|
| 124.41 g | deionized water |
| 6.00 g | 15% strength by weight aqueous solution of sodium lauryl sulfate |
| 18.00 g | 1,4-butanediol diacrylate |
| 217.80 g | n-butyl acrylate |
| 79.20 g | methyl methacrylate |

Feed Z3:

| | |
|---|---|
| 1.80 g | 3% strength by weight aqueous ammonia solution |

Feed Z4:

| | |
|---|---|
| 2.40 g | 3% strength by weight aqueous ammonia solution |

Rinse water 2:

| | |
|---|---|
| 12.00 g | deionized water |

Feed Z5:

| | |
|---|---|
| 28.08 g | 5% strength by weight aqueous ammonia solution |

Feed Z6:

| | |
|---|---|
| 45.00 g | 12% strength by weight aqueous solution of adipic acid dihydrazide |

Rinse water 3:

| | |
|---|---|
| 6.62 g | deionized water |

This gave a polymer dispersion having a solids content of 41.9% by weight, a pH of 9.5, an average particle size of 73 nm (determined by means of HPPS) and a weight-average particle diameter of 61 nm (determined by means of HDC). The Brookfield viscosity was 103 mPa·s at 100 s$^{-1}$ and 69 mPa·s at 250 s$^{-1}$, respectively. The glass transition temperatures were −9° C. and 90° C. (determined by DSC) and the minimum film forming temperature was 0° C.

Example 7

Dispersion D7

Preparation took place as described for example 1 with the exception that after cooling to room temperature following feed Z5 the additional feed Z6 was metered in and the thus obtained aqueous polymer dispersion was then mixed with rinse water 3 and filtered through a 125 μm filter. The following feeds and rinse waters were used instead of those given in example 1:

Initial charge:

| | |
|---|---|
| 290.93 g | deionized water |
| 12.00 g | 15% strength by weight aqueous solution of sodium lauryl sulfate, |

Feed Z1 (homogeneous mixture of):

| | |
|---|---|
| 33.00 g | deionized water |
| 3.00 g | 15% strength by weight aqueous solution of sodium lauryl sulphate |
| 2.16 g | 2-ethylhexyl thioglycolate |
| 54.00 g | 20% strength by weight aqueous solution of diacetone acrylamide |
| 2.03 g | acrylic acid |
| 8.78 g | hydroxyethyl methacrylate |
| 13.50 g | n-butyl acrylate |
| 13.50 g | styrene |
| 86.40 g | methyl methacrylate |

Rinse water 1:

| | |
|---|---|
| 12.00 g | deionized water |

Feed Z2 (homogeneous mixture of):

| | |
|---|---|
| 124.42 g | deionized water |
| 6.00 g | 15% strength by weight aqueous solution of sodium lauryl sulfate |
| 18.00 g | 1,4-butanediol diacrylate |
| 217.80 g | n-butyl acrylate |
| 79.20 g | methyl methacrylate |

Feed Z3:

| | |
|---|---|
| 1.80 g | 3% strength by weight aqueous ammonia solution |

Feed Z4:

| | |
|---|---|
| 2.40 g | 3% strength by weight aqueous ammonia solution |

Rinse water 2:

| | |
|---|---|
| 12.00 g | deionized water |

Feed Z5:

| | |
|---|---|
| 28.08 g | 5% strength by weight aqueous ammonia solution |

Feed Z6:

| | |
|---|---|
| 45.00 g | 12% strength by weight aqueous solution of adipic acid dihydrazide |

Rinse water 3:

| | |
|---|---|
| 6.62 g | deionized water |

This gave a polymer dispersion having a solids content of 42.3% by weight, a pH of 9.4, an average particle size of 77 nm (determined by means of HPPS) and a weight-average particle diameter of 60 nm (determined by means of HDC). The Brookfield viscosity was 83 mPa·s at 100 s$^{-1}$ and 61 mPa·s at 250 s$^{-1}$, respectively. The glass transition temperatures were −11° C. and 83° C. (determined by DSC) and the minimum film forming temperature was 4° C.

Example 8

Preparation of Carbodiimide Solution 300 weight portions (1.35 mol) of isophorone diisocyanate (IPDI) were mixed with 300 g of methoxypropyl acetate (MPA) in a round-bottom flask equipped with reflux condenser and thermometer. The mixture was heated to 90° C. and then 92.8 weight portions (0.12 mol) of a methanol-initiated polyethylene oxide (molar mass 760 g/mol) were added. After 270 min the content of isocyanate was determined to be 16.1% by weight. The reaction was heated to 145° C. and then 0.6 weight portions of 1-methyl-2-phospholene 1-oxide (MPO) were added, the mixture was stirred at 145° C. for 24 hours and then cooled to 100° C. Afterwards the content of isocyanate was determined to be 1.9% by weight. 11 weight portions of ethanol were added and the mixture was stirred at 100° C. for 24 h. After this time no isocyanate content could be determined any more.

Comparative Example 1

Dispersion CD1

Preparation took place as described for example 1 with the exception that after cooling to room temperature following feed Z5 the additional feed Z6 was metered in and the thus obtained aqueous polymer dispersion was then mixed with rinse water 3 and filtered through a 125 μm filter. The following feeds and rinse waters were used instead of those given in example 1:

Initial charge:

| | |
|---|---|
| 290.93 g | deionized water |
| 12.00 g | 15% strength by weight aqueous solution of sodium lauryl sulfate, |

Feed Z1 (homogeneous mixture of):

| | |
|---|---|
| 33.00 g | deionized water |
| 3.00 g | 15% strength by weight aqueous solution of sodium lauryl sulfate |
| 2.16 g | 2-ethylhexyl thioglycolate |
| 54.00 g | 20% strength by weight aqueous solution of diacetone acrylamide |
| 2.03 g | acrylic acid |
| 8.78 g | methacrylic acid |
| 13.50 g | n-butyl acrylate |
| 13.50 g | styrene |
| 86.40 g | methyl methacrylate |

Rinse water 1:

| | |
|---|---|
| 2.00 g | deionized water |

Feed Z2 (homogeneous mixture of):

| | |
|---|---|
| 123.47 g | deionized water |
| 6.00 g | a 15% strength by weight aqueous solution of sodium lauryl sulfate |
| 217.80 g | n-butyl acrylate |
| 97.20 g | methyl methacrylate |

Feed Z3:

| | |
|---|---|
| 8.55 g | 3% strength by weight aqueous ammonia solution |

Feed Z4:

| | |
|---|---|
| 10.80 g | 3% strength by weight aqueous ammonia solution |

Rinse water 2:

| | |
|---|---|
| 2.00 g | deionized water |

Feed Z5:

| | |
|---|---|
| 43.38 g | 5% strength by weight aqueous ammonia solution |

Feed Z6:

| | |
|---|---|
| 45.00 g | 12% strength by weight aqueous solution of adipic acid dihydrazide |

Rinse water 3:

| | |
|---|---|
| 15.03 g | deionized water |

This gave a polymer dispersion having a solids content of 41.8% by weight, a pH of 8.8, an average particle size of 88 nm (determined by means of HPPS) and a weight-average particle diameter of 56 nm (determined by means of HDC). The Brookfield viscosity was 314 mPa·s at 100 s$^{-1}$ and 233 mPa·s at 250 s$^{-1}$, respectively. The glass transition temperatures were −13° C. and 112° C. (determined by DSC) and the minimum film forming temperature was below 0° C.

Comparative Example 2

Dispersion CD2

Preparation took place as described for example 1 with the exception that after cooling to room temperature following feed Z5 the additional feed Z6 was metered in and the thus obtained aqueous polymer dispersion was then mixed with rinse water 3 and filtered through a 125 μm filter. The following feeds and rinse waters were used instead of those given in example 1:

Initial charge:

| 290.93 g | deionized water |
| 12.00 g | 15% strength by weight aqueous solution of sodium lauryl sulfate, |

Feed Z1 (homogeneous mixture of):

| 33.00 g | deionized water |
| 3.00 g | 15% strength by weight aqueous solution of sodium lauryl sulfate |
| 2.16 g | 2-ethylhexyl thioglycolate |
| 54.00 g | 20% strength by weight aqueous solution of diacetone acrylamide |
| 2.03 g | acrylic acid |
| 8.78 g | methacrylic acid |
| 13.50 g | n-butyl acrylate |
| 13.50 g | styrene |
| 86.40 g | methyl methacrylate |

Rinse water 1:

| 2.00 g | deionized water |

Feed Z2 (homogeneous mixture of):

| 123.47 g | deionized water |
| 6.00 g | a 15% strength by weight aqueous solution of sodium lauryl sulphate |
| 18.00 g | 1,4-butanediol diacrylate |
| 217.80 g | n-butyl acrylate |
| 79.20 g | methyl methacrylate |

Feed Z3:

| 8.55 g | 3% strength by weight aqueous ammonia solution |

Feed Z4:

| 10.80 g | 3% strength by weight aqueous ammonia solution |

Rinse water 2:

| 2.00 g | deionized water |

Feed Z5:

| 43.38 g | 5% strength by weight aqueous ammonia solution |

Feed Z6:

| 45.00 g | 12% strength by weight aqueous solution of adipic acid dihydrazide |

This gave a polymer dispersion having a solids content of 41.7% by weight, a pH of 8.8, an average particle size of 90 nm (determined by means of HPPS) and a weight-average particle diameter of 56 nm (determined by means of HDC). The Brookfield viscosity was 320 mPa·s at 100 s$^{-1}$ and 237 mPa·s at 250 s$^{-1}$, respectively. The glass transition temperatures were −12° C. and 108° C. (determined by DSC) and the minimum film forming temperature was below 0° C.

III EVALUATION OF BINDER COMPOSITIONS

The dispersions D2 D3, CD1 and CD2, as obtained in Examples 2 and 3 and Comparative Examples 1 and 2 were admixed with butyl glycol and deionized water, respectively, in the amounts indicated in table 1. The "% by weight" numbers given relate to the weight of the respective dispersion. The resulting diluted dispersions were divided into two portions. To one portion of each dispersion was then added a carbodiimide in an amount of 10% by weight in the cases of CD1 and CD2 and 5% by weight in the cases of D2 and D3, relative in each case to the weight of the polymer included in the dispersion (% (solid/solid)). The carbodiimide was employed as a 50% by weight solution in dipropyleneglycol monomethylether (Dowanol DMM, Dow Chemicals). It is based on isophorone diisocyanate and monomethyl polyethylene glycol and can be prepared by a synthesis analogous to the one described in Example 8. The obtained mixtures, the ones treated with the carbodiimide and the untreated ones for comparison, were used for the determinations of resistances to several chemicals and compositions, as well as to water and water steam, as described below. In addition, samples of all mixtures were stirred at 23° C. for 5 min and then their viscosities were measured as listed in table 1.

TABLE 1

|  | CD1 | CD1 + CDI | CD2 | CD2 + CDI | D2 | D2 + CDI | D3 | D3 + CDI |
| --- | --- | --- | --- | --- | --- | --- | --- | --- |
| Viscosity [mPa · s] | 314 |  | 320 |  | 80 |  | 148 |  |
| pH value | 8.8 |  | 8.8 |  | 9.6 |  | 9.5 |  |
| Acid number | 15.70 |  | 15.70 |  | 3.41 |  | 3.41 |  |
| CDI, amount add in % (solid/solid) |  | 10 |  | 10 |  | 5 |  | 5 |
| Additional water, amount added in wt.-% | 5 |  | 5 |  |  |  |  |  |
| Butyl glycol, amount added in wt.-% |  |  |  |  | 5 |  | 1 |  |
| Viscosity change after addition of CDI |  | strong increase: paste-like |  | strong increase: paste-like |  | no change |  | no change |
| Resistance to: (exposure time: 16 h) |  |  |  |  |  |  |  |  |
| acetone | 4.5 | 4.5 | 4.0 | 5.0 | 5.0 | 0.5 | 4.0 | 3.0 |
| red wine | 0.0 | 0.0 | 0.0 | 0.0 | 0.0 | 0.5 | 0.5 | 0.0 |
| instant coffee | 1.0 | 0.0 | 1.0 | 1.0 | 1.0 | 1.0 | 0.5 | 0.5 |
| black currant juice | 0.0 | 0.0 | 0.0 | 0.0 | 0.0 | 0.0 | 0.0 | 0.0 |

TABLE 1-continued

|  | CD1 | CD1 + CDI | CD2 | CD2 + CDI | D2 | D2 + CDI | D3 | D3 + CDI |
|---|---|---|---|---|---|---|---|---|
| ethyl acetate/butyl acetate (50:50 v/v) | 4.5 | 4.0 | 4.5 | 4.0 | 5.0 | 1.0 | 5.0 | 1.0 |
| ethanol (48 wt.-% in water) | 2.5 | 1.0 | 3.0 | 1.0 | 0.5 | 0.5 | 3.0 | 1.0 |
| olive oil | 0.0 | 0.0 | 0.0 | 0.0 | 0.0 | 0.0 | 0.5 | 0.0 |
| ammonia (10 wt.-% in water) | 2.0 | 0.5 | 1.0 | 0.5 | 0.0 | 0.0 | 0.5 | 0.0 |
| Average chemical resistance | 1.8 | 1.3 | 1.7 | 1.4 | 1.4 | 0.4 | 1.8 | 0.7 |
| Resistance to: |  |  |  |  |  |  |  |  |
| water steam: 5 min exposure | 1.0 | 0.0 | 0.5 | 0.0 | 1.0 | 0.0 | 1.0 | 0.0 |
| water steam: 30 min exposure | 1.0 | 0.0 | 1.0 | 0.0 | 1.0 | 0.0 | 1.5 | 0.0 |
| water steam: recreation after 24 h | 1.0 | 0.0 | 1.0 | 0.0 | 1.0 | 0.0 | 1.5 | 0.0 |
| water: 24 h exposure | 0.0 | 0.0 | 0.0 | 0.0 | 0.0 | 0.0 | 0.0 | 0.0 |
| hand cream: 2 h exposure at 60° C. | 4.5 | 4.5 | 4.5 | 4.5 | 0.5 | 0.5 | 3.0 | 3.0 |

(abbreviations: CDI = carbodiimide; wt.-% = % by weight):

Determination of the Resistances to Several Chemicals and Compositions

1. Formation of a Coating Using the Prepared Dispersions

Each of the mixtures based on the dispersions D2, D3, CD1 and CD2 as described above that are either treated with carbodiimide or untreated were applied to a special photo paper in the form of a 200 microns wet film. The films were allowed to flash off initially for 30 min at room temperature and afterwards for at least 16 hours at 60° C. Before subjecting the obtained coatings to the resistance tests it is cooled down for 30 to 45 min at room temperature.

2. Examination of the Resistances of the Formed Coatings

Cellulose pads with a diameter of 2.8 cm were soaked for 20 min in each of the chemicals and compositions listed in table 2 below, with the exception of olive oil. The pads were placed for the exposure times indicated in table 2 on the coated substrate obtained according the procedure described above. Olive oil was applied dropwise to the coated substrate with the help of a pipette and likewise exposed for the time period given in table 2.

TABLE 2

| chemicals and compositions | exposure times |
|---|---|
| Acetone | 16 h |
| red wine | 16 h |
| instant coffee | 16 h |
| black currant juice | 16 h |
| ethyl acetate/butyl acetate mixture | 16 h |
| aqueous ethanol (48% by weight) | 16 h |
| olive oil | 16 h |
| aqueous ammonia (10% by weight) | 16 h |

Afterwards the exposure spots were wiped softly with paper tissue and rinsed once with water. The quality of the coating at all exposed spots were rated 24 hours thereafter, with the exception of the spot of aqueous ethanol which was rated immediately, on a scale from 0 to 5 as described in table 3.

TABLE 3

| 0 | coating shows no change |
|---|---|
| 1 | coating shows slightly mat surface |
| 2 | coating shows severely mat surface |
| 3 | coating shows slightly white surface |
| 4 | coating shows severely white surface |
| 5 | coating completely destroyed |

The results are listed in table 1.

The entry "Average chemical resistance" in table 1 represent the arithmetic average of all values of the resistances to specific chemicals and compositions determined before.

For the determination of resistance to water, water steam and handcream, the following procedures were applied to a 200 µm wet film on a macorée panel. Before testing, the samples were dried at 60° C. for 30 min, afterwards an intermediate sanding was applied (Zwischenschliff), and then the samples were dried at 60° C. for additional 24 h.

Water Resistance

A cellulose pad with a diameter of 2.5 cm was soaked in distilled water for 20 min and additional water was applied on the pad with help of a pipette. The pad was then placed for 24 h on the coated substrate, removed and the spot where the pad had been located was rated immediately, on a scale from 0 to 5 as described in table 3. The results are listed in table 1.

Water Steam Resistance

Distilled water was heated in a conical flask on top of which the coated substrate was placed. The coated substrate was vaporized for 5 and 30 min, respectively, then the tested spot was wiped softly and rated immediately, on a scale from 0 to 5 as described in table 3. Finally, a recreation value was rated after 24 h at room temperature. The results are listed in table 1.

Hand Cream Resistance

A spot of 2.5 cm diameter of Atrix handcream was applied on the coated substrate. The coated substrate was stored at 60° C. for 2 h, then the tested spot was wiped softly and the substrate was cooled to room temperature for 30 to 45 min. The tested spot was then wiped softly again and rated immediately, on a scale from 0 to 5 as described in table 3. The results are listed in table 1.

As can be seen from table 1, in comparison to comparative dispersions CD1 and CD2 the inventive polymer dispersions D2 and D3 result in binder compositions that not only maintain low viscosities and thus possess strongly improved pot-lives, but also show superior resistances to chemicals. This is all the more surprising as compared to CD1 and CD2 only half the amount of crosslinking carbodiimide was added to D2 and D3. These advantageous properties correlate with the much lower acid numbers of D2 and D3 as compared to CD1 and CD2.

The invention claimed is:

1. An aqueous binder composition, comprising:
    a) a polymer P in a form of an aqueous multistage polymer dispersion of dispersed polymer particles, and b) a carbodiimide comprising at least two carbodiimide moieties, which are bound to an aliphatic carbon atom, wherein the polymer particles comprise a first polymer having a glass transition temperature of at least 30° C. and being made of ethylenically unsaturated monomers M-A, and a second polymer having a glass transition temperature of not more than 20° C. and being made of ethylenically unsaturated monomers M-B; and the ethylenically unsaturated monomers M-A and M-B together comprise i. from 85% to 99.45% by weight, based on a total amount of monomers M-A and M-B, of at least one neutral, monoethylenically unsaturated monomer M1 having a solubility in water of at most 50 g/l at 25° C. and 1 bar, ii. from 0.5% to 10% by weight, based on the total amount of monomers M-A and M-B, of at least one neutral, monoethylenically unsaturated monomer M2 having a solubility in water of at least 100 g/l at 25° C. and 1 bar, iii. from 0.05 to 0.5% by weight, based on the total amount of monomers M-A and M-B, of one or more monoethylenically unsaturated monomers M3 comprising an acidic group, and iv. optionally from 0 to 5% by weight, based on the total amount of monomers M-A and M-B, of one or more monomers M4 comprising at least two non-conjugated ethylenically unsaturated double bonds.

2. The aqueous binder composition of claim 1, wherein the first polymer is present in an amount of from 5 to 50% by weight, based on a total weight of the first polymer and the second polymer.

3. The aqueous binder composition of claim 1, wherein the monomers M-A comprise i. from 80 to 99.4% by weight, based on a total amount of monomers M-A of at least one neutral, monoethylenically unsaturated monomer M1 having a solubility in water of at most 50 g/l at 25° C. and 1 bar;

ii. from 0.5% to 20% by weight, based on the total amount of monomers M-A, of at least one neutral, monoethylenically unsaturated monomer M2 having a solubility in water of at least 100 g/l at 25° C. and 1 bar, and iii. from 0.1 to 2% by weight, based on the total amount of monomers M-A, of one or more monoethylenically unsaturated monomers M3 comprising an acidic group.

4. The aqueous binder composition of claim 1, wherein the monomers M-B comprise from 90 to 100% by weight, based on a total amount of monomers M-B, of at least one neutral, monoethylenically unsaturated monomer M1 having a solubility in water of at most 50 g/l at 25° C. and 1 bar.

5. The aqueous binder composition of claim 4, wherein the monomers M-B comprise from 0.1 to 10% by weight, based on the total amount of monomers M-B, of one or more monomers M4 comprising at least two non-conjugated ethylenically unsaturated double bonds.

6. The aqueous binder composition of claim 1, wherein the first polymer has a number average molecular weight of from 2000 to 100000 g/mol.

7. The aqueous binder composition of claim 1, wherein the polymer P has an acid number of not more than 10 mg KOH.

8. The aqueous binder composition of claim 1, wherein the polymer particles of the aqueous multistage polymer dispersion have a volume average diameter, determined by light scattering, of from 10 to 500 nm.

9. The aqueous binder composition of claim 1, wherein the aqueous multistage polymer dispersion is obtained by aqueous radical emulsion polymerization of the monomers M-B in the presence of the first polymer.

10. The aqueous binder composition of claim 1, wherein the aqueous multistage polymer dispersion is obtained by sequential aqueous radical emulsion polymerization, which comprises (1) aqueous emulsion polymerization of the monomers M-A to obtain an aqueous dispersion of the first polymer and (2) aqueous emulsion polymerization of the monomers M-B in the aqueous dispersion of the first polymer.

11. The aqueous binder composition of claim 1, wherein the monomers M1 are selected from the group consisting of esters of monoethylenically unsaturated $C_3$-$C_8$ monocarboxylic acids with $C_1$-$C_{10}$ alkanols, and vinylaromatic hydrocarbons.

12. The aqueous binder composition of claim 1, wherein the monomers M2 are selected from the group consisting of hydroxy-$C_2$-$C_4$ alkyl esters of monoethylenically unsaturated $C_3$-$C_8$ monocarboxylic acids, primary amides of monoethylenically unsaturated $C_3$-$C_8$ monocarboxylic acids, esters of hydroxy-$C_3$-$C_{10}$-alkylketones with monoethylenically unsaturated $C_3$-$C_8$ monocarboxylic acids, amides of amino-$C_3$-$C_{10}$-alkylketones with monoethylenically unsaturated $C_3$-$C_8$ monocarboxylic acids, monoesters of monoethylenically unsaturated $C_3$-$C_8$ carboxylic acids with polyoxy-$C_2$-$C_4$ alkylene ethers, and monoethylenically unsaturated monomers comprising a urea group.

13. The aqueous binder composition of claim 1, wherein the monomers M3 are selected from the group consisting of monoethylenically unsaturated $C_3$-$C_8$ monocarboxylic acids, and monoethylenically unsaturated $C_4$-$C_8$ dicarboxylic acids.

14. The aqueous binder composition of claim 1, wherein the monomers M4 are selected from the group consisting of diesters of monoethylenically unsaturated $C_3$-$C_8$ monocarboxylic acids with saturated aliphatic or cycloaliphatic diols, monoesters of monoethylenically unsaturated $C_3$ $C_8$ monocarboxylic acids with monoethylenically unsaturated aliphatic or cycloaliphatic monohydroxy compounds, and divinyl aromatic compounds.

15. The aqueous binder composition of claim 1, wherein the carbodiimide is present in an amount of from 0.1 to 30% by weight, based on a weight of the polymer P.

16. The aqueous binder composition of claim 1, wherein the carbodiimide comprises poly-$C_2$-$C_3$-alkylene oxide groups.

17. The aqueous binder composition of claim 1, wherein the carbodiimide is an aliphatic carbodiimide, which comprises a structural unit represented by:

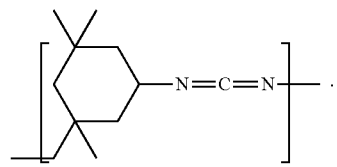

18. The aqueous binder composition of claim 1, wherein the carbodiimide comprises from 2 to 20% by weight of N═C═N moieties, based on a weight of the carbodiimide.

19. An aqueous multistage polymer dispersion of dispersed polymer particles, wherein polymer P particles comprise a first polymer having a glass transition temperature of at least 30° C. and being made of ethylenically unsaturated monomers M-A, and a second polymer having a glass transition temperature of not more than 20° C. and being made of ethylenically unsaturated monomers M-B, the polymer particles comprise:
a) the first polymer of from 5 to 50% by weight, based on a total weight of the first polymer and the second polymer, where the monomers M-A consist of:
   i. from 80 to 99.4% by weight, based on a total amount of monomers M-A of at least one neutral, monoethylenically unsaturated monomer M1 having a solubility in water of at most 50 g/l at 25° C. and 1 bar;
   ii. from 0.5% to 20% by weight, based on the total amount of monomers M-A, of at least one neutral, monoethylenically unsaturated monomer M2 having a solubility in water of at least 100 g/l at 25° C. and 1 bar; and
   iii. from 0.1 to 2% by weight, based on the total amount of monomers M-A, of one or more monoethylenically unsaturated monomers M3 having an acidic group; and
b) the second polymer of from 50 to 95% by weight, based on the total weight of the first polymer and the second polymer where the monomers M-B comprise
   iv. from 90 to 100% by weight, based on a total amount of monomers M-B, of at least one neutral, monoethylenically unsaturated monomer M1 having a solubility in water of at most 50 g/l at 25° C. and 1 bar; and
   v. optionally from 0 to 10% by weight, based on the total amount of monomers M-B, of one or more monomers M4 comprising at least two non-conjugated ethylenically unsaturated double bonds, and
the polymer P is defined in claim 1.

20. The aqueous multistage polymer dispersion of claim 19, wherein the monomers M-B comprise from 0.1 to 10% by weight, based on the total amount of monomers M-B, of one or more monomers M4 comprising at least two non-conjugated ethylenically unsaturated double bonds.

21. The aqueous multistage polymer dispersion of claim 19, wherein the first polymer has a number average molecular weight of from 2000 to 100000 g/mol.

22. The aqueous multistage polymer dispersion of claim 19, wherein the polymer P has an acid number of not more than 10 mg KOH.

23. The aqueous multistage polymer dispersion of claim 19, wherein the polymer particles of the aqueous multistage polymer dispersion have a volume average diameter, determined by light scattering, of from 10 to 500 nm.

24. The aqueous multistage polymer dispersion of claim 19, wherein the aqueous multistage polymer dispersion is obtained by aqueous radical emulsion polymerization of the monomers M-B in the presence of the first polymer.

25. The aqueous multistage polymer dispersion of claim 19, wherein the aqueous multistage polymer dispersion is obtained by sequential aqueous radical emulsion polymerization, which comprises
(1) aqueous emulsion polymerization of the monomers M-A to obtain an aqueous dispersion of the first polymer, and
(2) aqueous emulsion polymerization of the monomers M-B in the aqueous dispersion of the first polymer.

26. The aqueous multistage polymer dispersion of claim 19, wherein the monomers M1 are selected from the group consisting of esters of monoethylenically unsaturated $C_3$-$C_8$ monocarboxylic acids with $C_1$-$C_{10}$ alkanols, and vinylaromatic hydrocarbons.

27. The aqueous multistage polymer dispersion of claim 19, wherein the monomers M2 are selected from the group consisting of hydroxy-$C_2$-$C_4$ alkyl esters of monoethylenically unsaturated $C_3$-$C_8$ monocarboxylic acids, primary amides of monoethylenically unsaturated $C_3$-$C_8$ monocarboxylic acids, esters of hydroxy-$C_3$-$C_{10}$-alkylketones with monoethylenically unsaturated $C_3$-$C_8$ monocarboxylic acids, amides of amino-$C_3$-$C_{10}$-alkylketones with monoethylenically unsaturated $C_3$-$C_8$ monocarboxylic acids, monoesters of monoethylenically unsaturated $C_3$-$C_8$ carboxylic acids with polyoxy-$C_2$-$C_4$ alkylene ethers, and monoethylenically unsaturated monomers comprising a urea group.

28. The aqueous multistage polymer dispersion of claim 19, wherein the monomers M3 are selected from the group consisting of monoethylenically un-saturated $C_3$-$C_8$ monocarboxylic acids and monoethylenically unsaturated $C_4$-$C_8$ dicarboxylic acids.

29. The aqueous multistage polymer dispersion of claim 19, wherein the monomers M4 are selected from the group consisting of diesters of monoethylenically unsaturated $C_3$-$C_8$ monocarboxylic acids with saturated aliphatic or cycloaliphatic diols, monoesters of monoethylenically unsaturated $C_3$-$C_8$ monocarboxylic acids with monoethylenically unsaturated aliphatic or cycloaliphatic monohydroxy compounds, and divinyl aromatic compounds.

30. A coating composition, comprising: the aqueous binder composition of claim 1.

31. The coating composition according to claim 30, further comprising: at least one additional binder selected from the group consisting of a polyurethane binder, a polyester binder, and an aldehyde resin.

\* \* \* \* \*